(12) United States Patent
Medoro et al.

(10) Patent No.: US 12,005,450 B2
(45) Date of Patent: Jun. 11, 2024

(54) METHOD AND APPARATUS FOR THE REDUCTION OF THE VOLUME OF A SAMPLE

(71) Applicant: Menarini Silicon Biosystems S.p.A., Castel Maggiore (IT)

(72) Inventors: Gianni Medoro, Casalecchio di Reno (IT); Alex Calanca, Mirandola (IT); Fabrizio Alberti, Trentino (IT)

(73) Assignee: Menarini Silicon Biosystems S.p.A., Castel Maggiore (IT)

( * ) Notice: Subject to any disclaimer, the term of this patent is extended or adjusted under 35 U.S.C. 154(b) by 924 days.

(21) Appl. No.: 16/648,634

(22) PCT Filed: Sep. 21, 2018

(86) PCT No.: PCT/IB2018/057303
§ 371 (c)(1),
(2) Date: Mar. 18, 2020

(87) PCT Pub. No.: WO2019/058321
PCT Pub. Date: Mar. 28, 2019

(65) Prior Publication Data
US 2020/0282399 A1    Sep. 10, 2020

(30) Foreign Application Priority Data

Sep. 21, 2017   (IT) .................. 102017000105911

(51) Int. Cl.
*B01L 3/00*   (2006.01)
*G01N 1/40*   (2006.01)

(52) U.S. Cl.
CPC ....... *B01L 3/502753* (2013.01); *B01L 3/5021* (2013.01); *G01N 1/4077* (2013.01);
(Continued)

(58) Field of Classification Search
CPC ... B01J 2219/00421; B01J 2219/00905; B01L 3/502; B01L 3/5021; B01L 2400/0409;
(Continued)

(56) References Cited

U.S. PATENT DOCUMENTS 5,234,667 A     8/1993  Radtke et al.
6,121,054 A  *  9/2000  Lebl ....................... C07K 1/045
                                              530/334

(Continued)

FOREIGN PATENT DOCUMENTS

CA     2918921 A1    2/2015
CN     1410155 A     4/2003
(Continued)

OTHER PUBLICATIONS

Office Action, Chinese patent application No. 201880061425.X, dated Jun. 29, 2021.
(Continued)

*Primary Examiner* — Jill A Warden
*Assistant Examiner* — Dwayne K Handy
(74) *Attorney, Agent, or Firm* — MARSHALL, GERSTEIN & BORUN LLP

(57) ABSTRACT

Method and apparatus for the reduction of the volume of a sample; the method comprises an acceleration step, during which a container containing the sample is accelerated so that a part of a liquid component of the sample flows out of an opening of one end of the container; according to some embodiments, the container is made to rotate around a rotation axis passing through the container; the container is orientated radially relative to the rotation axis with its opening facing outwards.

20 Claims, 19 Drawing Sheets

(52) U.S. Cl.
CPC ............... *B01L 2200/0652* (2013.01); *G01N 2001/4088* (2013.01)

(58) Field of Classification Search
CPC ............... G01N 1/4077; G01N 21/07; G01N 2030/002; G01N 2035/00495; G01N 35/0098
See application file for complete search history.

(56) References Cited

U.S. PATENT DOCUMENTS

| | | | |
|---|---|---|---|
| 6,150,182 | A | 11/2000 | Cassaday |
| 6,280,400 | B1 | 8/2001 | Niermann |
| 7,645,223 | B2 | 1/2010 | Namkoong et al. |
| 2003/0049563 | A1 | 3/2003 | Iida et al. |
| 2006/0110296 | A1* | 5/2006 | Tajima ............... G01N 35/025 422/63 |
| 2010/0120599 | A1 | 5/2010 | Sarofim et al. |
| 2012/0028349 | A1* | 2/2012 | Giorgini ............... G01N 1/4077 435/325 |
| 2015/0031040 | A1 | 1/2015 | Calanca et al. |
| 2020/0033240 | A1 | 1/2020 | Cherubini et al. |

FOREIGN PATENT DOCUMENTS

| | | |
|---|---|---|
| CN | 203606330 | 5/2014 |
| CN | 104136126 A | 11/2014 |
| CN | 106573256 A | 4/2017 |
| EP | 0937502 A2 | 8/1999 |
| EP | 1262445 A1 | 12/2002 |
| JP | S61162565 A | 7/1986 |
| JP | 2001523550 A | 11/2001 |
| JP | 2002-362684 A | 12/2002 |
| JP | 2006198614 A | 8/2006 |
| JP | 2010-133952 A | 6/2010 |
| WO | WO-00/69565 A1 | 11/2000 |
| WO | WO-2007/010367 A2 | 1/2007 |
| WO | WO-2007/049120 A2 | 5/2007 |
| WO | WO-2010/038141 A1 | 4/2010 |
| WO | WO-2010/106426 A1 | 9/2010 |
| WO | WO-2010/106428 A2 | 9/2010 |
| WO | WO-2010/106434 A1 | 9/2010 |
| WO | WO-2012/085884 A1 | 6/2012 |
| WO | WO-2013/003309 A1 | 1/2013 |
| WO | WO-2013/098792 A1 | 7/2013 |

OTHER PUBLICATIONS

International Search Report and Written Opinion, corresponding International Application No. PCT/IB2018/057303, dated Dec. 20, 2018.

Second Written Opinion of the International Preliminary Examining Authority, corresponding International Application No. PCT/IB2018/057303, dated Aug. 13, 2019.

International Preliminary Report on Patentability, corresponding International Application No. PCT/IB2018/057303, dated Dec. 18, 2019.

* cited by examiner

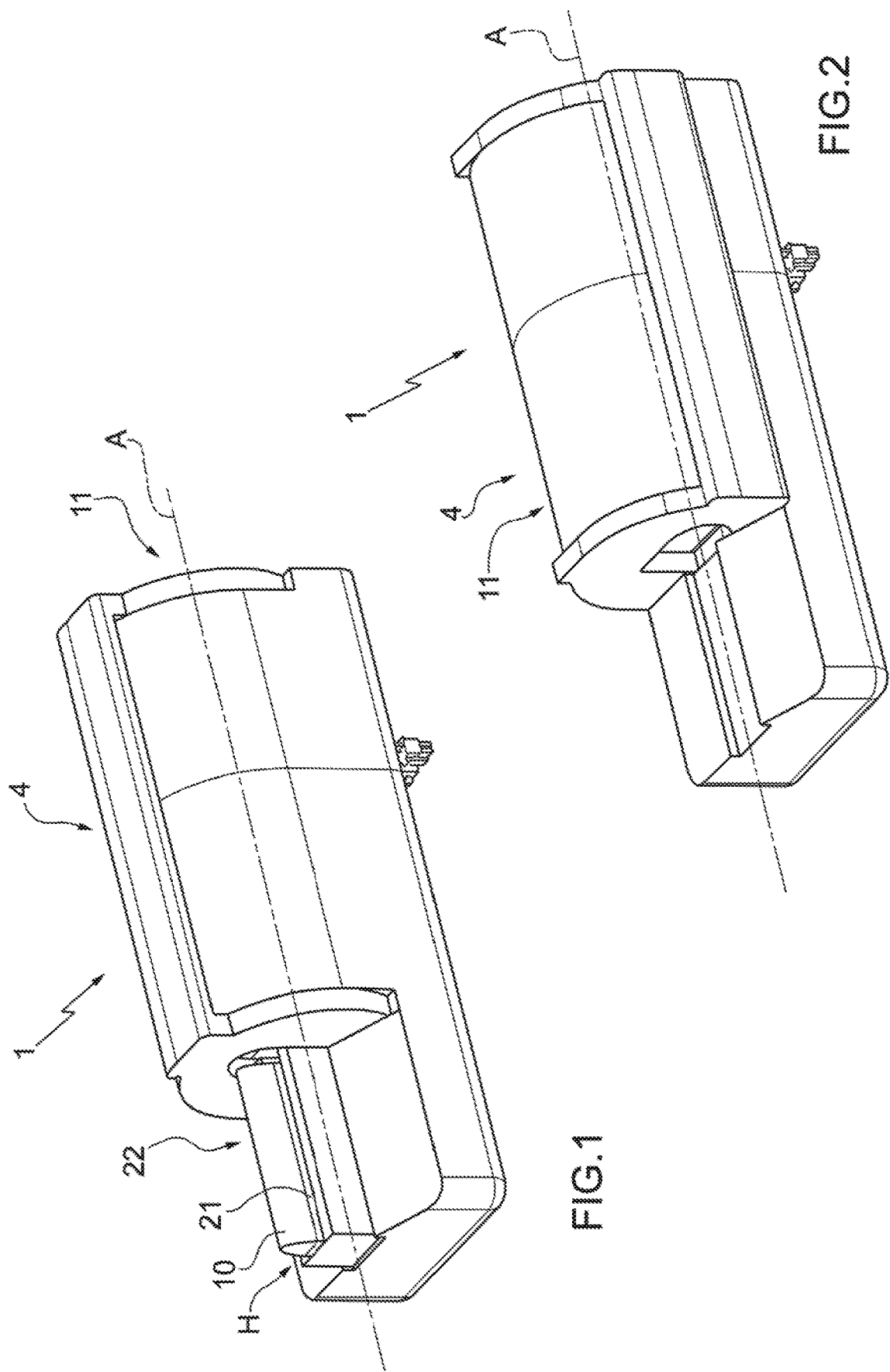

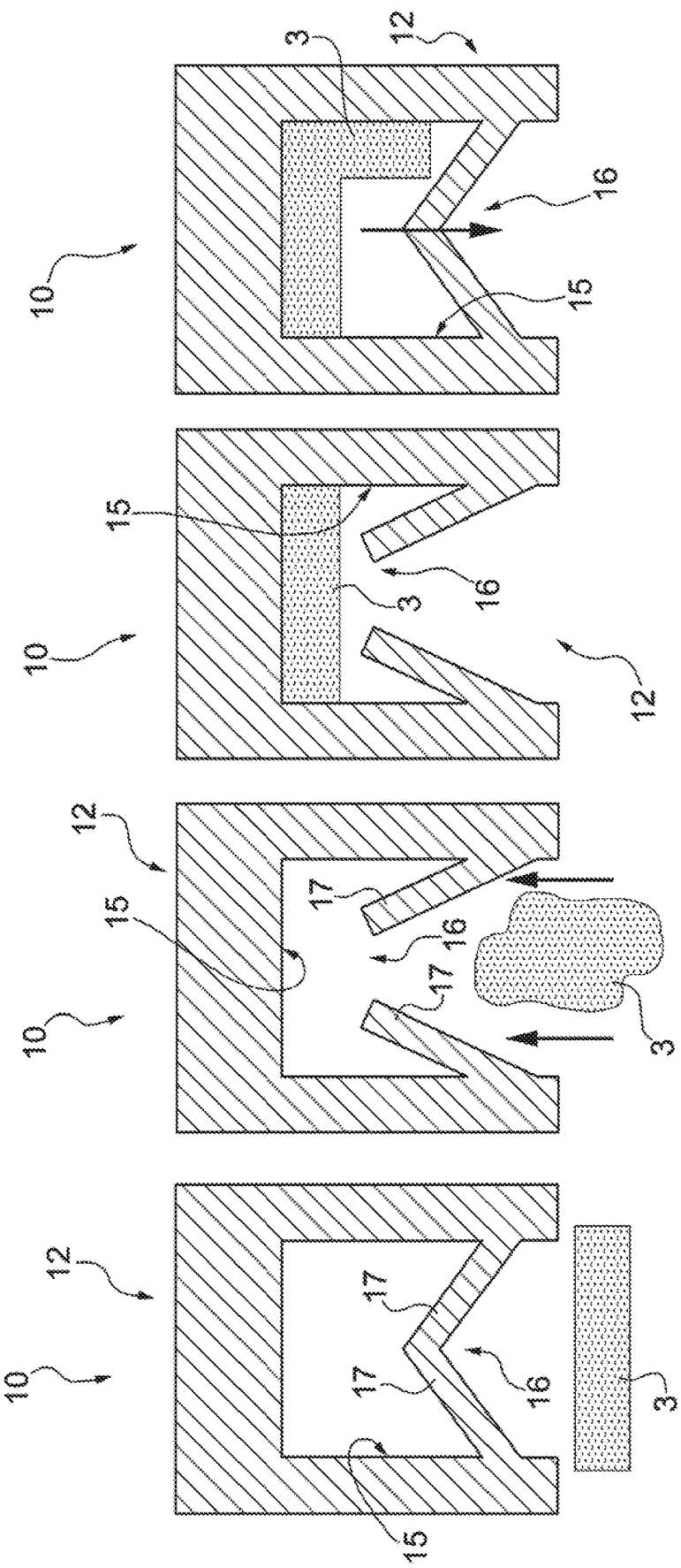

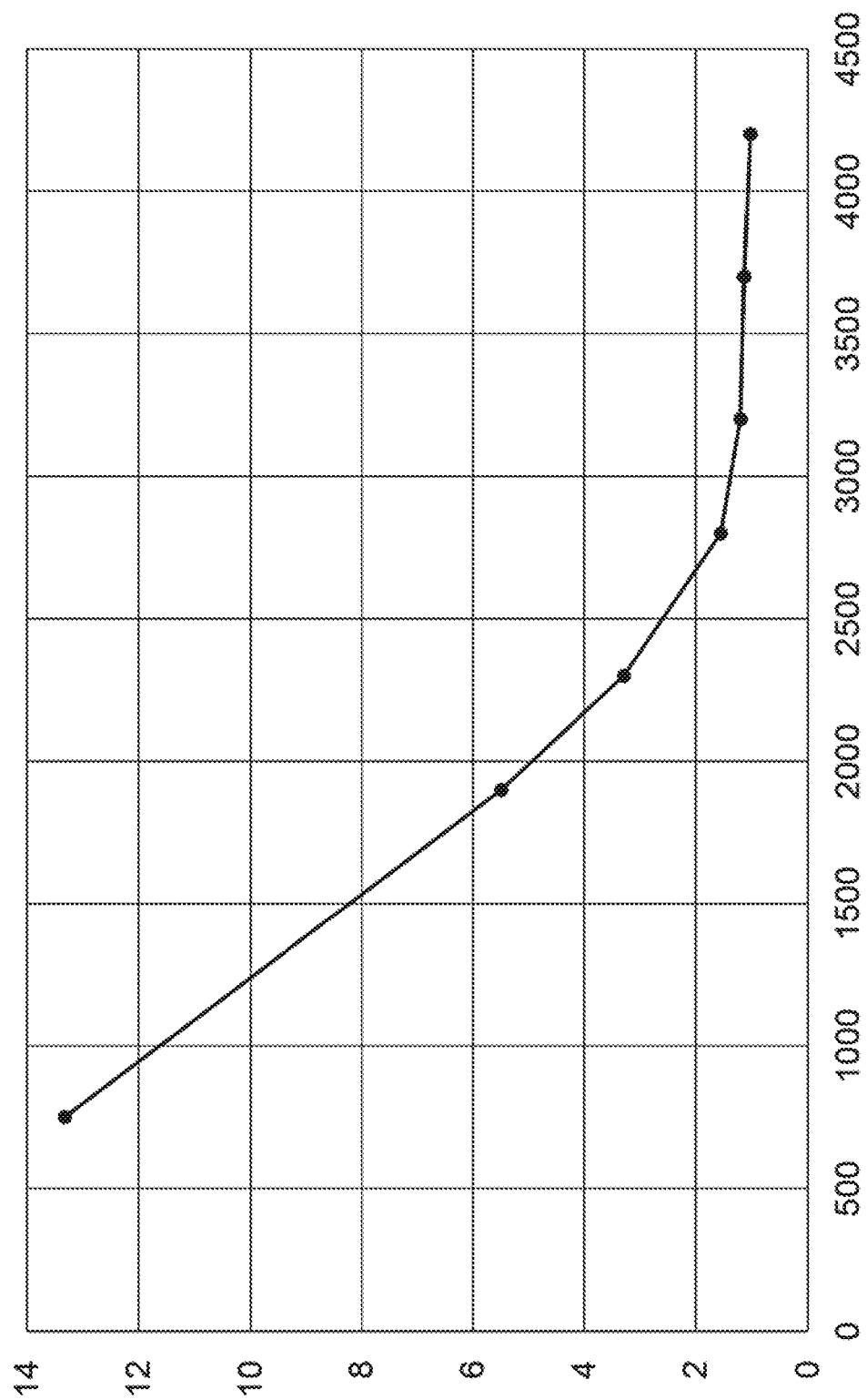

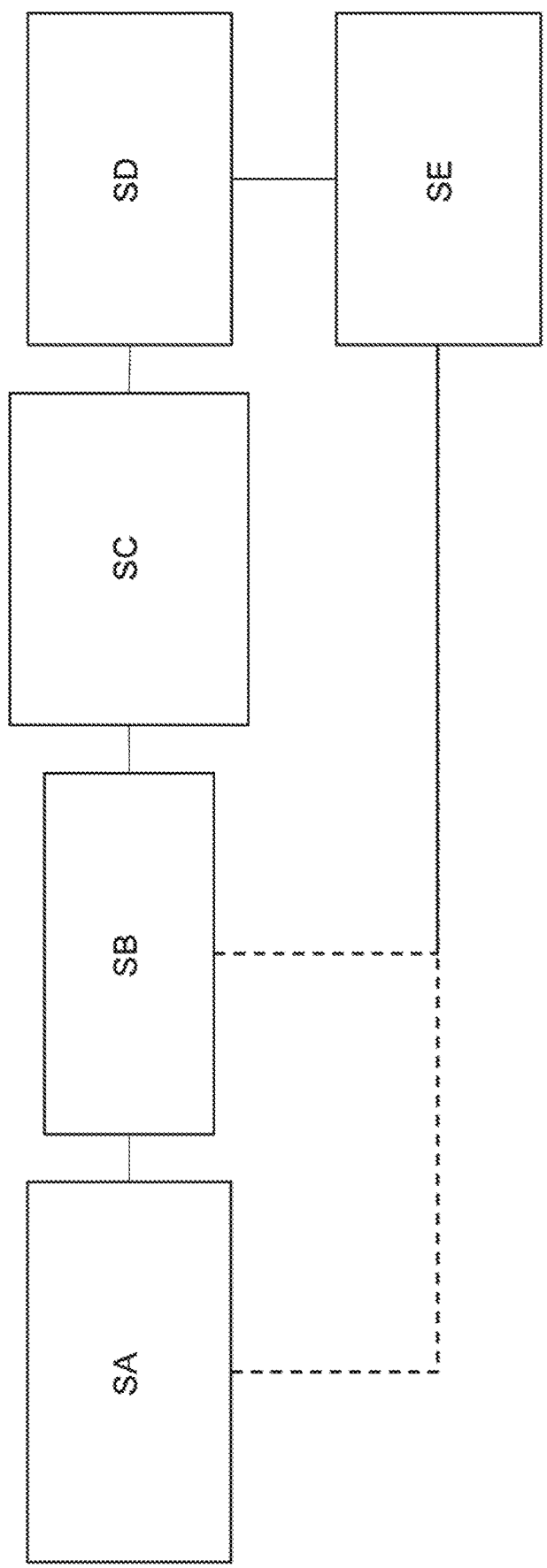

METHOD AND APPARATUS FOR THE REDUCTION OF THE VOLUME OF A SAMPLE

CROSS-REFERENCE TO RELATED APPLICATION

The present application is the U.S. national phase of International Patent Application No. PCT/IB2018/057303 filed Sep. 21, 2018, which claims the benefit of priority from Italian Patent Application No. 102017000105911 filed on Sep. 21, 2017, the respective disclosures of which are each incorporated herein by reference in their entireties.

TECHNICAL FIELD

The present invention concerns a method and an apparatus for the reduction of the volume of a sample.

BACKGROUND TO THE INVENTION

Biological samples are known to be treated in different ways so as to obtain the isolation of particular types of microparticles (normally, cells).

Examples in this regard are the devices and the methods described in the patent applications PCT/IB2010/000615 PCT/IB2010/000580 (relative to the DEPArray™ system).

Usually, at the end of the above-mentioned treatments samples are obtained in which the microparticles are inserted in a liquid component. In relation to the above, it should be noted that the liquid component is normally a buffer, which cannot be used in subsequent analysis phases, and that the volume of the samples is usually too high. For example, the samples obtained following the use of the DEPArray™ system have volumes of approximately 13 µL, whereas subsequent phases (such as WGA—Whole Genome Amplification) require volumes of a few microlitres, in particular less than 5 µL, more in particular less than 1.5 µL.

It is therefore necessary for the samples to be treated by centrifugation at high speed and for an operator to manually collect the excess liquid with great care and attention using a pipette (and by inclining the test tube containing the sample). This process entails multiple problems. These include:
 the success of the operations depends, to a great extent, on the ability of the operator who must be adequately trained and must practise periodically;
 there is a risk, which can be high if the operator does not operate correctly, of removing the microparticle together with the excess liquid;
 the success rate of the procedure is not reliable and always reproducible, and depends on the type of buffer used;
 the operations are relatively slow (the recovery of 96 samples requires approximately three hours);
 the procedure requires particular care such as the use of dedicated pipettes and dual filter tips without contamination to reduce the risk of the sample becoming contaminated during handling by the operator;
 there is a relatively high risk of the microparticle/s being damaged due to the centrifugation which, as said, is performed at relatively high speeds (therefore exerting a relatively high stress on the microparticle/s); and
 this procedure is not recommended for in vitro diagnostic (IVD) applications.

Analogous problems are encountered when it is necessary to prepare the biological samples before the above-mentioned treatments to obtain the isolation of particular types of microparticles (normally, cells). In these cases the initial and final volumes are higher (typically, approximately 200 µL and 12 µL, respectively) but the drawbacks of the known techniques (centrifugation at high speed and subsequent collections by hand by an operator) are those described above with the addition of the fact that often, to obtain the desired volume, several measurements have to be taken repetitively.

Moreover, substantially identical problems are encountered also in other cases in which the volume of the sample is low (like, for example, staining of the cells, washing of the cells, changing of the buffer, fixing of cells, permeabilization of cells and a combination thereof). Said problems are heightened also when the number of microparticles (cells) is low.

More generally, no methods that are satisfactory, sufficiently precise and/or reproducible have been proposed so far for reduction of the volume of a sample with small dimensions.

The object of the present invention is to provide a method and an apparatus for reduction of the volume of a sample which overcome, at least partially, the drawbacks of the known art and are if possible, at the same time, easy and inexpensive to produce.

SUMMARY

According to the present invention a method and an apparatus are provided for reduction of the volume of a sample as claimed in the following independent claims and, preferably, in any one of the claims depending directly or indirectly on the independent claims.

Unless explicitly specified otherwise, in this text the following terms have the meaning indicated below.

By equivalent diameter of a section we mean the diameter of a circle having the same area as the section.

By microfluidic system we mean a system comprising at least one microfluidic channel and/or at least one microfluidic chamber. Advantageously but not necessarily, the microfluidic system comprises at least one pump (more in particular, a plurality of pumps), at least one valve (more in particular, a plurality of valves) and if necessary at least one gasket (more in particular, a plurality of gaskets).

In particular, by microfluidic channel we mean a channel having a section with equivalent diameter smaller than 0.5 mm.

In particular, the microfluidic chamber has a height of less than 0.5 mm. More in particular, the microfluidic chamber has a width and a length greater than the height (more precisely, at least five times the height).

In the present text, by microparticle we mean a corpuscle tis largest dimension being smaller than 500 µm (advantageously smaller than 150 µm). According to some non-limiting examples, the microparticle is chosen from: cells, cellular debris (in particular, cellular fragments—e.g. DNA and/or RNA), cellular aggregates (such as, for example, small clusters of cells deriving from stem cells like neurospheres or mammospheres), bacteria, lipo-beads, micro-beads (in polystyrene and/or magnetic), nano-beads (e.g. nano-beads up to 100 nm) complexes formed of micro-beads (in particular, magnetic; in particular with largest dimension smaller than 500 µm) bound to cells, circulating tumour cells bound to ferrofluid, exosomes, colloidal suspension (e.g. ferrofluid), liposomes, nuclei, spores, and a combination thereof. Advantageously but not necessarily, the microparticles are cells.

According to some non-limiting embodiments, the largest dimension of the microparticles (advantageously cells and/or cellular debris) is smaller than 60 μm.

The dimensions of the microparticles can be measured in a standard manner with graduated scale microscopes or ordinary microscopes used with slides (on which the microparticles are deposited) having a graduated scale.

In the present text, by dimensions of a microparticle we mean the length, the width and the thickness of the microparticle.

BRIEF DESCRIPTION OF THE FIGURES

The invention is described below with reference to the accompanying drawings, which illustrate some non-limiting embodiments thereof, in which:

FIGS. 1 and 2 are schematic and perspective views of an apparatus in accordance with the present invention in successive operating phases;

FIGS. 13 to 16 illustrate schematically and in section a further embodiment of the component of FIG. 12 in successive operating phases;

FIG. 32 is a graphic representation of the experimental results obtained by testing the method of the present invention with a structure similar to the one shown in FIG. 27; the Y axis indicates the volume obtained (in μL); the X axis shows the angular speed used for the experiment (in RPM); and FIG. 33 is a flow diagram relative to possible uses of the method according to the present invention.

DETAILED DISCLOSURE

Figure 4:
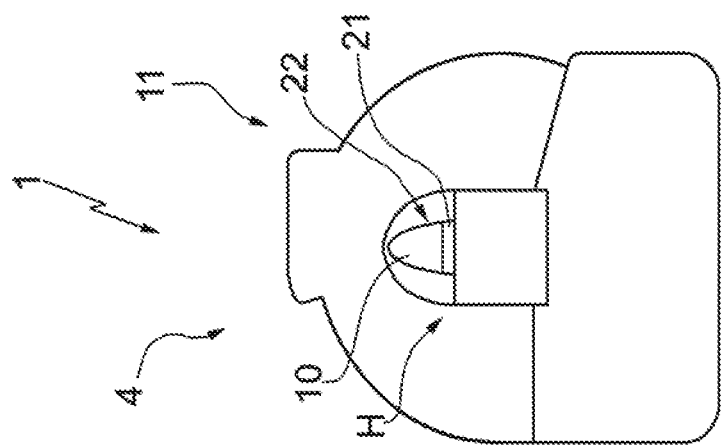
FIG. 4 is a front view of the apparatus of FIG. 1.

In FIG. 1, the number 1 indicates overall an apparatus for reduction of the volume of a sample 2 (FIGS. 9, 10 and 23-29) comprising at least one (at least partially) liquid component 3.

The apparatus 1 (in particular, FIGS. 1-11) comprises a manipulation assembly 4 provided with at least one seat 5 to support (at least partially) at least one container 6 (FIGS. 7, 12 and 20-22), having an inner space, a closed end 7, an end 8 provided with an opening 8', which establishes contact between the inner and the outer space, and (at least) one side wall 9 (which extends between the ends 7 and 8). In particular, the inner space is delimited (at least partially) by the side wall 9 and by the closed end 7.

In particular, the container 6 can be inserted in and removed from the manipulation assembly 4 (more precisely, can be inserted in and removed from the seat 5). More in particular, the apparatus 1 comprises the container 6.

The manipulation assembly 4 comprises a collecting device 10 (in particular, FIGS. 3, 4, 6, 7 and 12-19), which is adapted to collect a first part of said (at least partially) liquid component 3 and is arranged externally to the seat 5 and close to (in the area of) said seat 5.

The manipulation assembly 4 is adapted to move the seat 5 so as to subject it to an acceleration (having at least one component), orientated by the collecting device 10 towards the seat 5 in particular so that the first part of said (at least partially) liquid component 3 flows out of the container 6 (passing through the opening 8') and reaches the collecting device 10 and a second part of the (at least partially) liquid component 3 (in particular, with a substantially defined volume) remains in the container 6, in particular at the closed end 7.

It should be noted that the acceleration is a vector quantity (a vector), therefore provided with modulus (intensity—magnitude) and direction. In particular, it should be noted that the acceleration (as opposed to the deceleration) is understood to be positive (therefore with positive modulus) and therefore entails an increase in the speed (in its own direction).

More in particular, in use, the acceleration determines at least one first inertial force on the first part of the sample 2 and at least one second inertial force on the second part of the sample 2. The first and the second inertial force are orientated from the first closed end 7 towards the second end transversally (in particular, perpendicularly) to said opening 8'. The manipulation assembly 4 is adapted to adjust the acceleration so that the first inertial force is greater than a first retaining force exerted between the first part of the sample and the container 6, and the second inertial force is smaller than a second retaining force exerted between the second part of the sample and the container 6.

According to some non-limiting embodiments (see in particular FIG. 9 and FIG. 25), the manipulation assembly 4 comprises a moving device 11, which is adapted to cause the container 6 to make a substantially linear movement accelerated in a given direction so that the seat 5 faces forward relative to the given direction and the collecting device 10 faces backward relative to the given direction (or more precisely, the closed end 7 faces forward and the end 8 faces backward). In other words, the collecting device 10 is arranged downstream of the seat 5 in the cited given direction.

According to some non-limiting embodiments (see in particular, FIGS. 1-11, 23, 24, 26 and 27), the manipulation assembly 4 comprises a moving device 11, which is adapted to rotate the seat 5 around a rotation axis A so that the centrifugal force moves said first part of said (at least partially) liquid component 3 (out of the container 6) to the collecting device 10.

In some cases, (the seat 5 is shaped so that) the rotation axis A extends through the container 6 between the closed end 7 and the end 8 (in particular, FIGS. 7, 11, 24 and 27).

Figure 10:
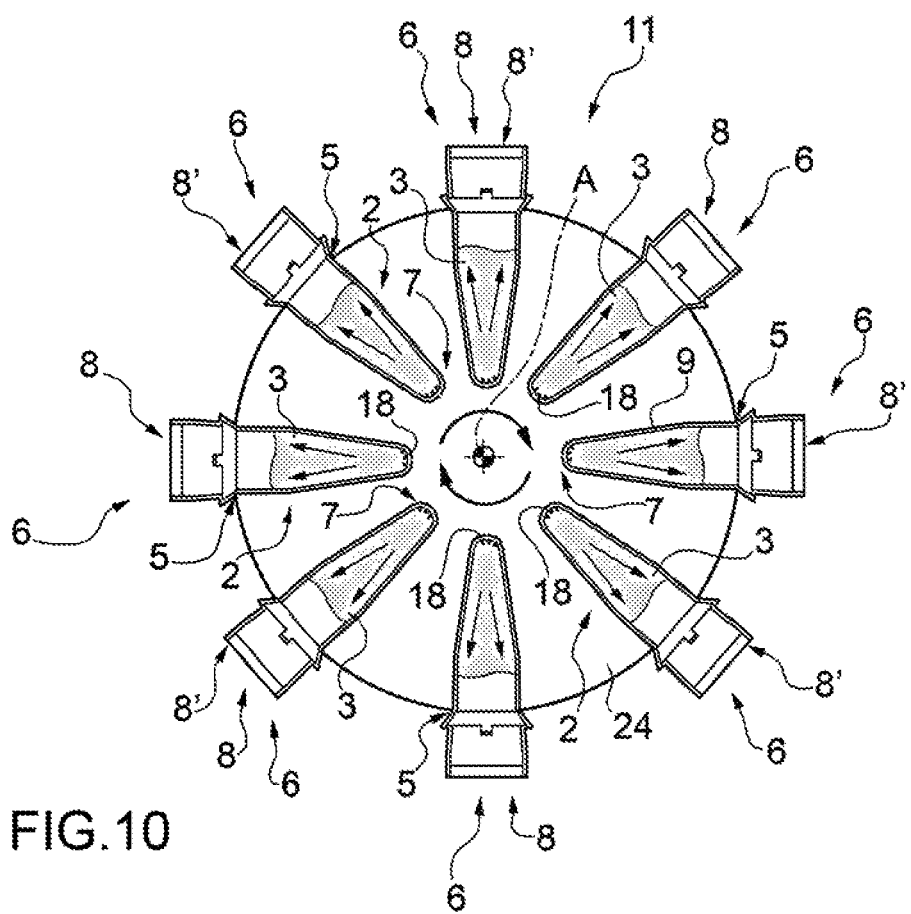
FIG. 10 is a schematic view of a part of a further embodiment of an apparatus in accordance with the present invention.
Figure 23:
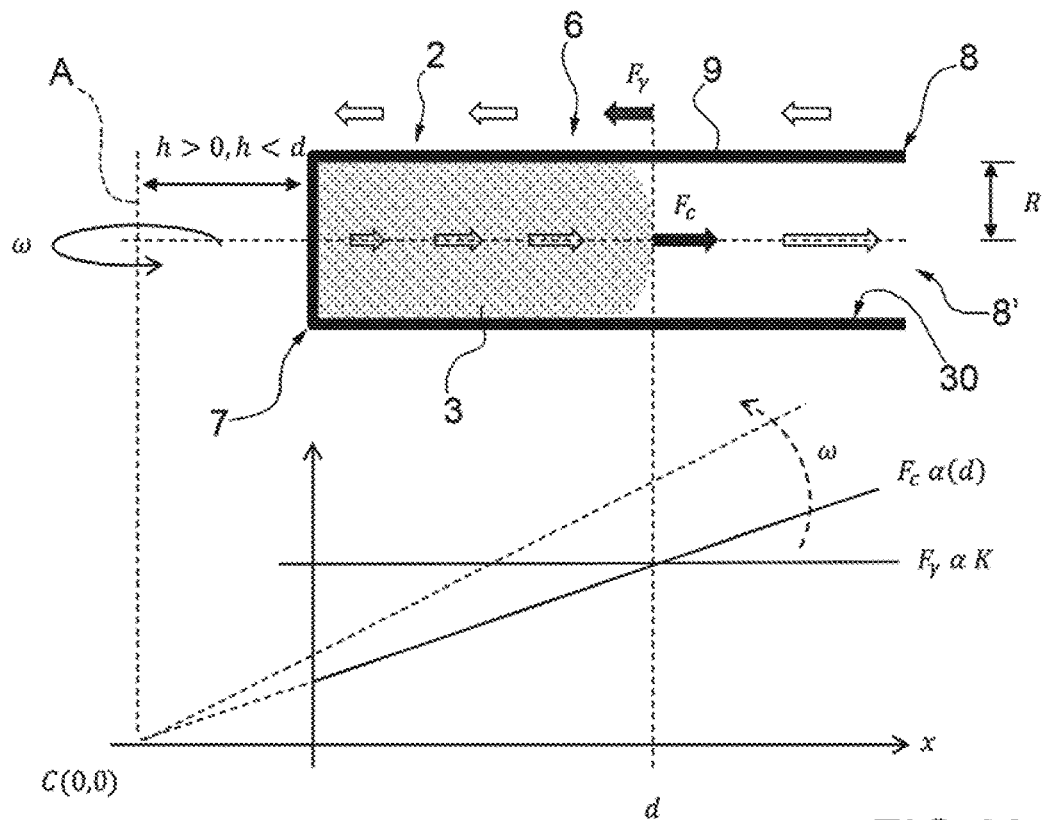
FIGS. 23, 24, 26 and 27 schematically illustrate some of the forces present during implementation of the present invention; the X axis shows the distance from the rotation axis, the Y axis shows the forces.
Figure 26:
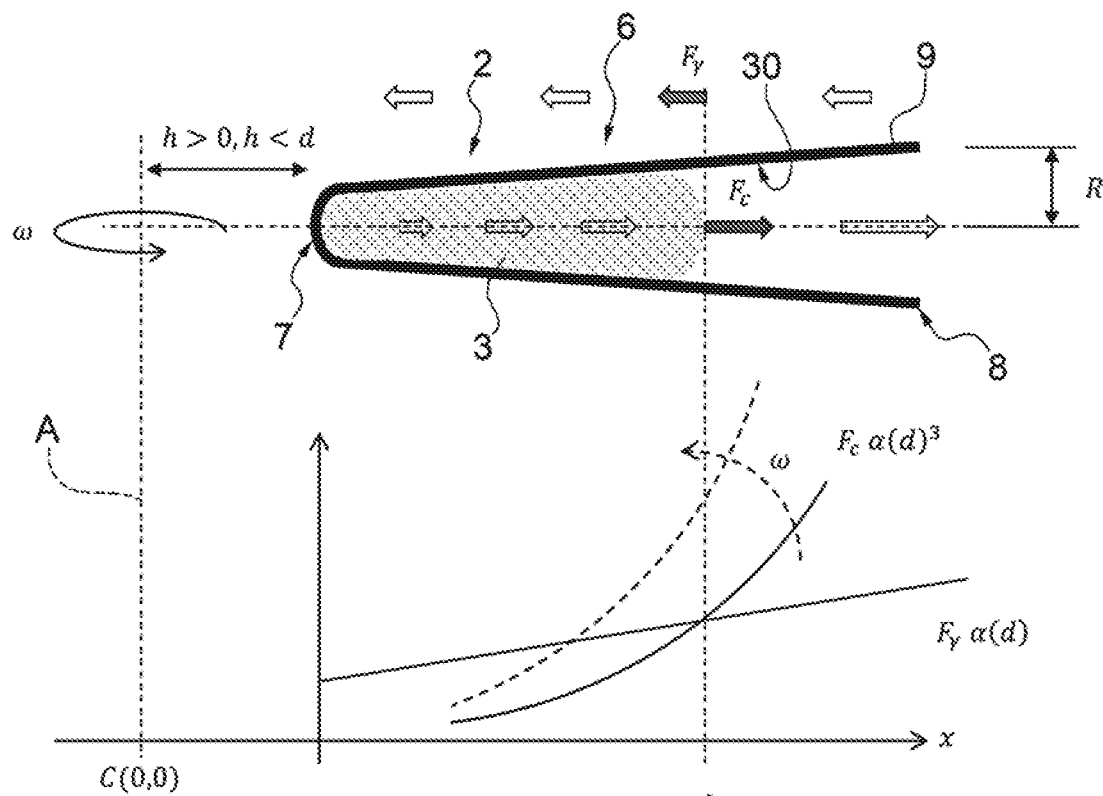

Alternatively, (the seat 5 is shaped so that) the closed end 7 is arranged between the rotation axis A and the end 8 (in particular, FIGS. 10, 23 and 26).

In some non-limiting cases, the collecting device 10 comprises a collecting area in which the (at least a fraction of the) first part of the (at least partially) liquid component 3 is collected (for any further subsequent uses). In these cases, the collecting device 10 can be, for example, a test tube.

Advantageously, but not necessarily (see, in particular, FIGS. 12 to 19), the collecting device 10 comprises a retaining system 12 to retain the (at least a fraction of the) first part of the (at least partially) liquid component 3.

In this way, the risk of a portion of the first part of the (at least partially) liquid component 3 flowing back into the container 6 is avoided.

In particular, in use, the collecting device 10 (more precisely, the retaining system 12) faces the opening 8'.

According to some non-limiting embodiments, the retaining system 12 comprises an element chosen from the group consisting of: absorbing material 13 (FIG. 12), capillary trap (FIGS. 17-19), liquid trap (FIGS. 13-16) (and a combination thereof).

The capillary trap (FIGS. 17-19) comprises a plurality of grooves 14 having width smaller than 2.0 mm, in particular smaller than 0.9 mm (more in particular greater than 0.5 mm). In this case, the liquid enters the grooves 14 due to the force (in particular centrifugal) to which it is subjected while the container 6 is accelerated and remains in said grooves 14 by capillarity (since the force of the surface tension is greater than the force of gravity). In particular, each groove 14 has a depth of at least 2 mm (typically, up to 7 mm).

The liquid trap comprises a collecting chamber 15 (FIGS. 13-16) provided with an inlet 16, at least one movable wall 17 (in the case in point two movable walls 17) moving between a closing position (FIGS. 13 and 16), in which it prevents (the outlet and the inlet of the liquid from and into the collecting chamber 14) the passage of liquid through the inlet 16, and an opening position (FIGS. 14 and 15), in which the liquid can pass through the inlet. The wall 17 is adapted to move to the opening position when, in use, said acceleration is applied. In particular, when the acceleration is not applied to the wall 17 (more generally, when no force is applied to the wall 17), the wall 17 is in the closing position. More precisely, once the acceleration is no longer applied to the seat 5, the wall 17 returns to the closed position. In particular, in use, the collecting device 10 faces the opening 8'.

More precisely, in use, the acceleration brings the movable wall 17 to the opening position. Even more precisely, in use, the acceleration brings the movable wall 17 to the opening position acting directly and/or indirectly on the movable wall. In particular, in some cases, the acceleration acts on the at least partially liquid component 3 which pushes the movable wall 17.

According to some non-limiting examples, the wall 17 is movable in the sense that it is (elastically) and/or is deformable (elastically) hinged.

Figure 12:
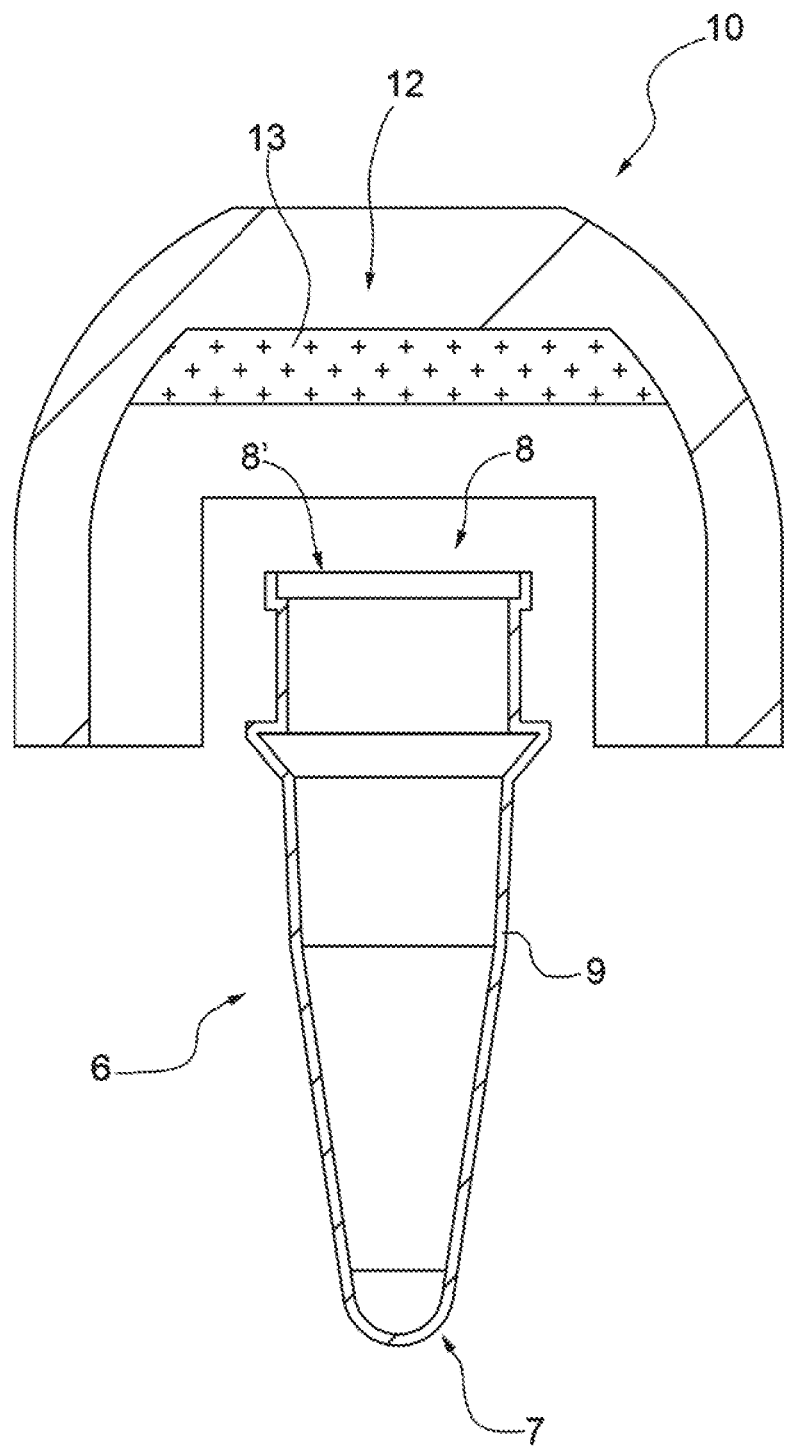
FIG. 12 is a schematic section view of a component of the apparatus of one of the preceding figures.
Figure 19:
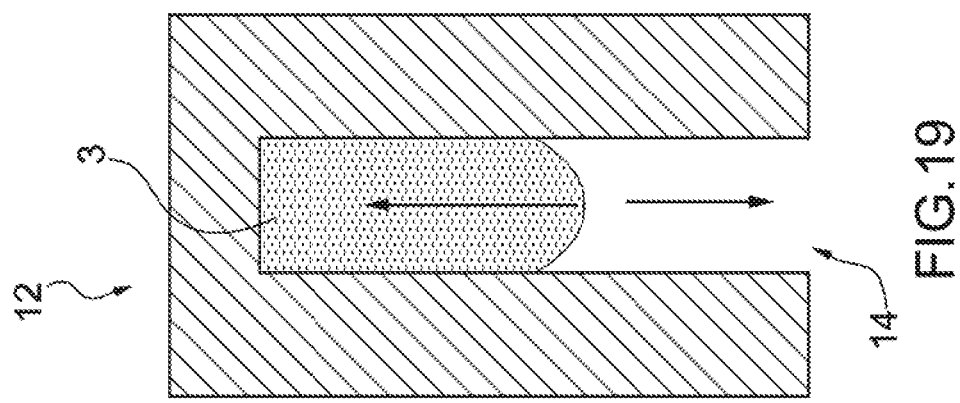
FIG. 19 illustrates a detail of the component of FIG. 18 on an enlarged scale.
Figure 18:
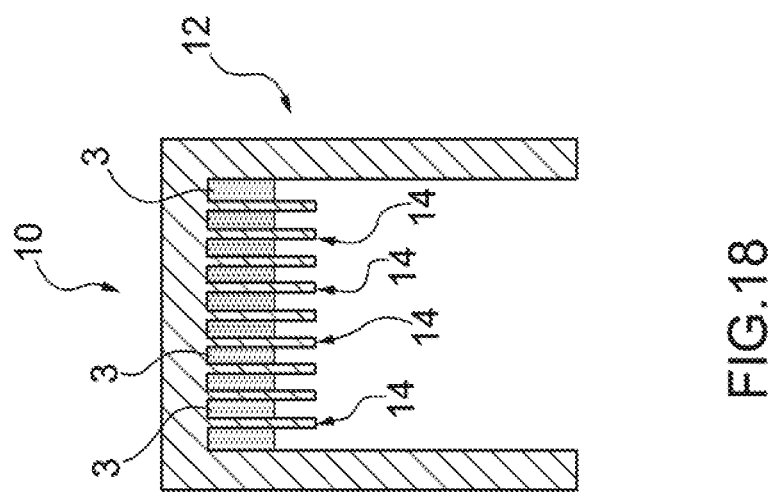
FIGS. 17 and 18 illustrate schematically and in section a further embodiment of the component of FIG. 12 in successive operating phases.
Figure 17:
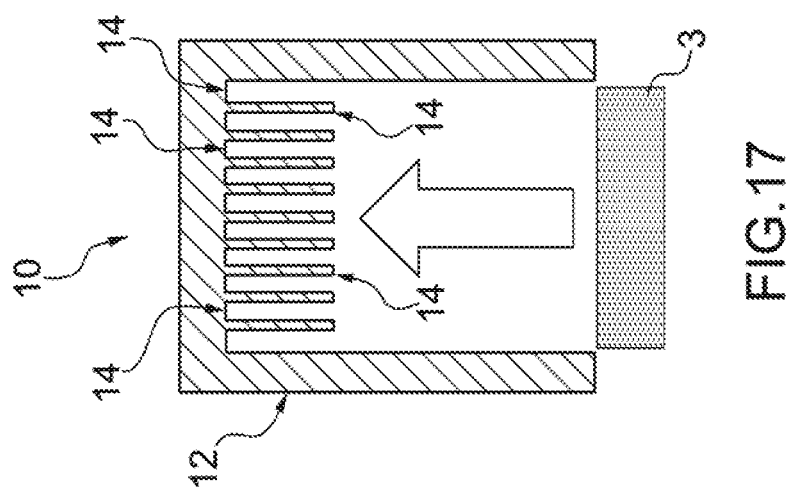
Figure 22:
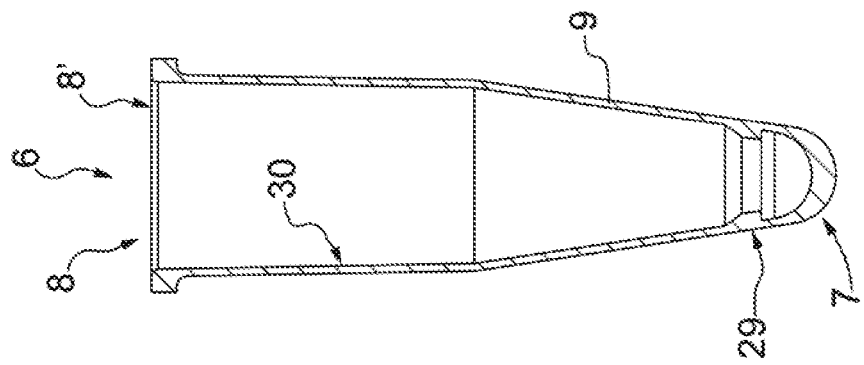
FIGS. 20 to 22 illustrate sections of alternative embodiments of containers usable in accordance with the present invention.
Figure 21:
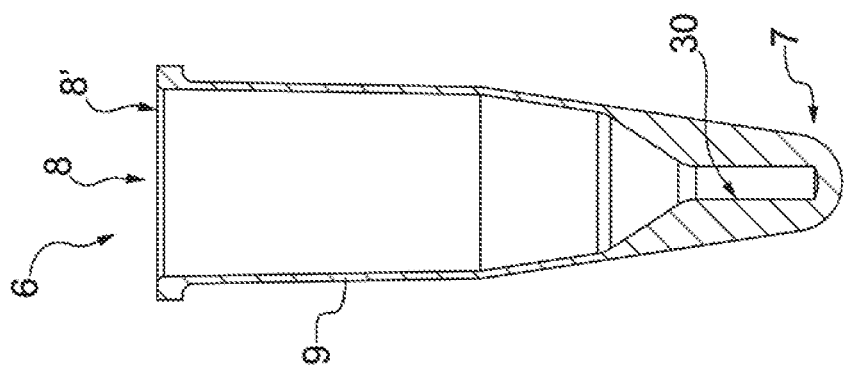

According to some non-limiting embodiments, the absorbing material 13 is blotting paper (FIG. 12).

Advantageously but not necessarily, the manipulation assembly 4 comprises a plurality of seats 5 (in particular, FIGS. 8-10), each of which is adapted to house a respective container 6. In particular, in these cases, the manipulation assembly 4 comprises a moving device 11, which is adapted to cause all the seats 5 to make the same movement.

According to some non-limiting embodiments (see for example FIG. 8), the seats 5 are arranged according to (at least) one row substantially parallel to the rotation axis A.

In some cases, the seats 5 are arranged according to a plurality of rows substantially parallel to the rotation axis A. In these cases, FIG. 10 illustrates a layer of the moving device 11 which is repeated several times. In other words, each seat 5 (of FIG. 10) is a seat belonging to a row of seats 5 (each of which is arranged, together with other seats 5 of other rows, around the axis A).

One or more flexible well-plates can be mounted directly on the moving device 11 (more precisely, on a rotor of the moving device 11), in particular (bent) around the axis A.

It should be noted that according to some preferred but non-limiting embodiments, the sample comprises at least one microparticle 18 (in particular, a plurality of microparticles 18).

Figure 11:
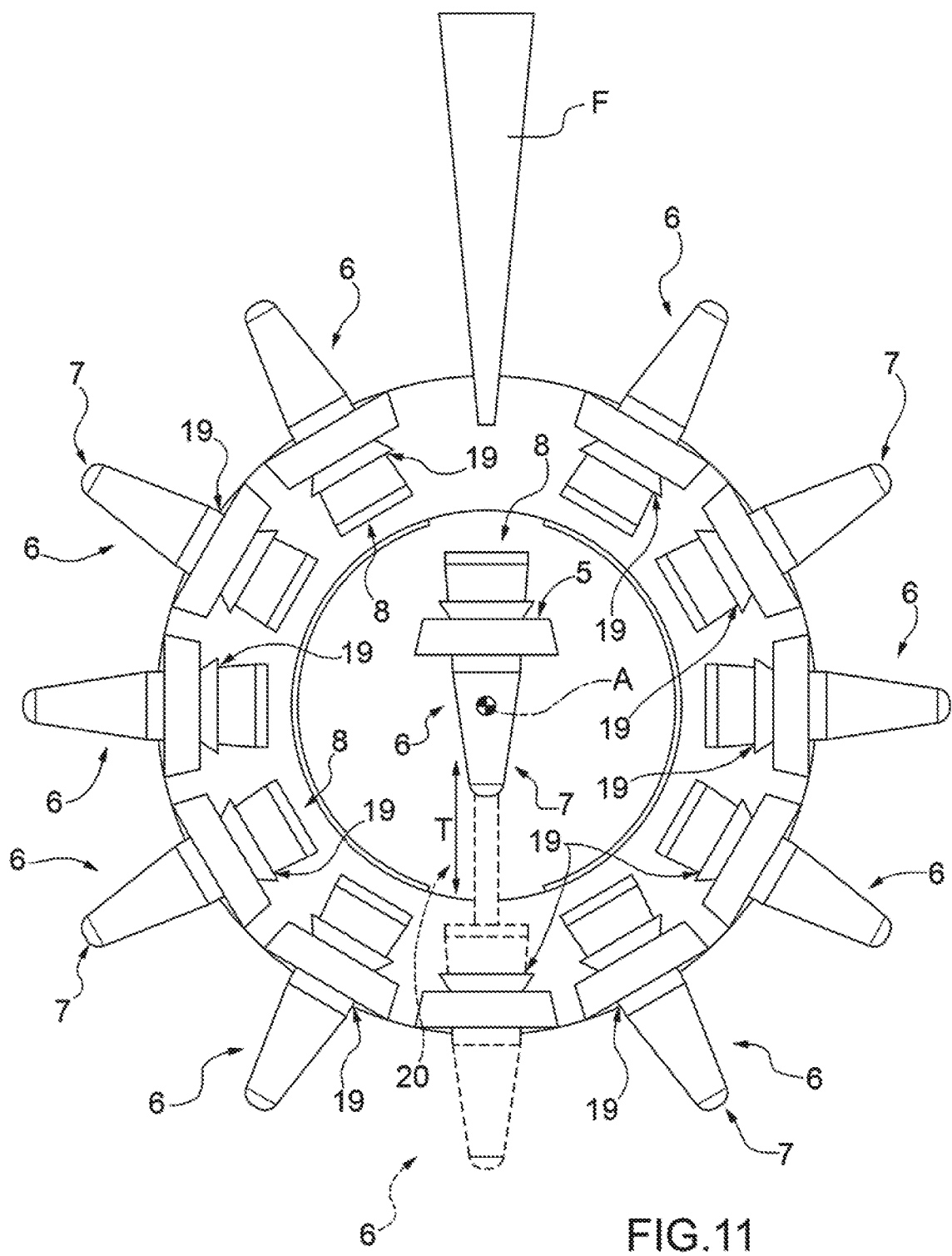
FIG. 11 is a schematic view of a part of a further embodiment of an apparatus in accordance with the present invention.

With particular reference to FIG. 11, according to some advantageous but non-limiting embodiments, the manipulation assembly 4 comprises a plurality of further peripheral seats 19, which are arranged around the rotation axis A and are adapted to house further containers 6 containing the (at least partially) liquid component 3 and to be rotated by the moving device 11 around the rotation axis A so that a centrifugal force is exerted on the (at least partially) liquid component 3 contained in the further containers 6 towards the closed end 7 of the further containers 6.

In this way, the moving device 11, in one single movement (the rotation around the axis A) is able simultaneously to reduce the volume of the sample 2 contained in the container 6 arranged in the seat 5 and to prepare the samples 2 contained in the other containers 6 arranged in the peripheral seats 19 (moving the microparticles 18 at the closed ends 7).

In particular the further peripheral seats 19 are arranged around the seat 5 which is, in particular, arranged (in a central position) at the axis A (more precisely, so that the axis A passes through the container 6 arranged in the seat 5).

Advantageously but not necessarily, the manipulation assembly comprises a moving device 20 (in particular with a cam operating mechanism—only partially and schematically illustrated), which is adapted to move a peripheral seat 8 (in practice becoming the seat 5) from its peripheral position to the position around which the other peripheral seats 8 are arranged and vice versa. In FIG. 11 this movement is illustrated by the arrow T.

According to some non-limiting embodiments, the moving device is adapted to move a row (substantially parallel to the axis A) of peripheral seats 19. In these cases, what is shown in FIG. 11 represents a layer of a structure which provides a plurality of rows of peripheral seats 19 (obtained, for example, in the same support 21).

It should be noted that the seat 5 (in particular, the support 21) and the collecting device 10 constitute together a cartridge 22 which can be inserted in and removed from the manipulation assembly 4 (in particular, inserted in and removed from the moving device 11).

Advantageously but not necessarily, the manipulation assembly (in particular, the moving device 11) comprises a sensor (of a type known per se and not illustrated) to detect the presence (and/or the correct positioning) of the cartridge 22 (in the moving device 11).

Advantageously but not necessarily, the cartridge 22 comprises a rewritable memory (of a type known per se and not illustrated—e.g. an RFID) and the manipulation assembly 4 comprises a reading and/or writing device (of a type known per se and not illustrated) of said rewritable memory. According to some non-limiting embodiments, information can be recorded on the rewritable memory relative to the cartridge 22, like an identification of the cartridge 22, parameters for use of the cartridge and/or number of times in which the cartridge 22 has been used. In particular, in use, the reading and/or writing device records on the above-mentioned memory when the relative cartridge 22 is used for the first time and whenever said cartridge 22 is mounted in the moving device 11 it detects that it is not a first utilization and emits an error signal. This avoids a cartridge 22 being used several times and the samples 2 being contaminated.

Advantageously but not necessarily, the manipulation assembly 4 comprises a support 21 on which a plurality of seats 5 are obtained. In these cases, the cartridge 22 comprises the support 21 and the collecting device 10.

Figure 8:
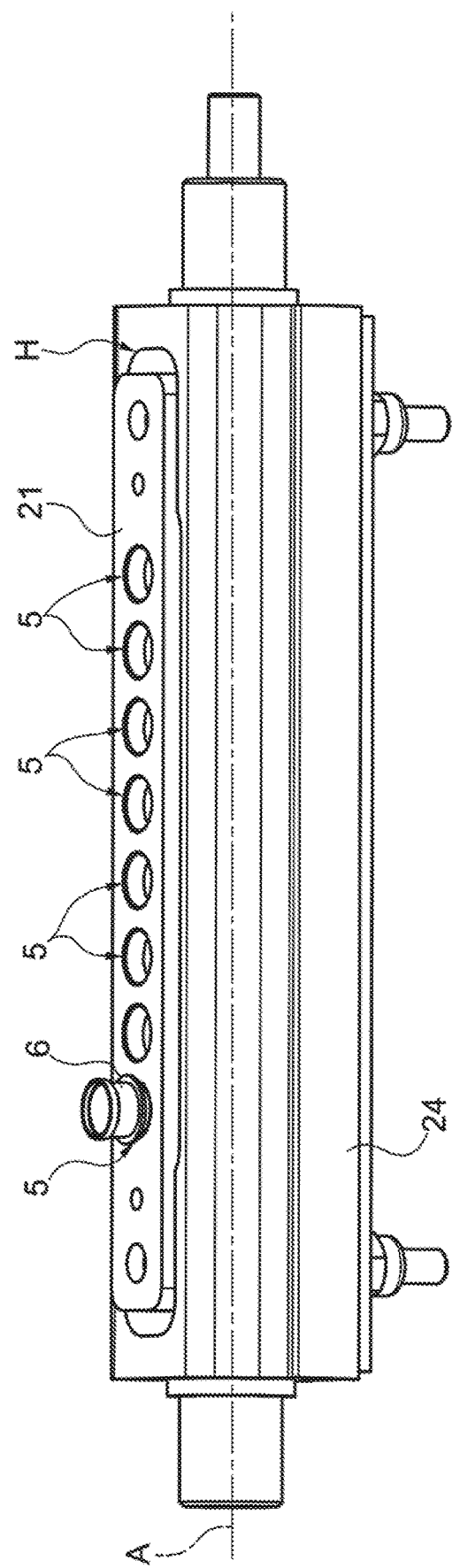
FIG. 8 is a perspective view of the part of FIG. 6 with some components removed for clarity.

With particular reference to FIG. 8, according to some non-limiting embodiments, the support 21 has a plurality of seats 5 arranged in a row.

In particular (FIGS. 6 and 7), the collecting device 10 is arranged above the seats 5, more in particular so as to cover the openings 8' of the containers 6. More in particular, the collecting device 10 is arranged above the support 21.

According to some non-limiting embodiments not illustrated, the manipulation assembly 4 comprises a magnet (permanent magnet and/or an electromagnet), arranged at the seat 5.

In some cases, the magnet is arranged at one end of the seat 5 opposite the collecting device 10. In particular, the magnet is arranged at the closed end 7. In some cases, the magnet is adapted to reduce the risk of the microparticle/s 18 (which comprises/comprise at least one magnetic functionalization) flowing out of the container 6 while the container 6, in use, is accelerated by the manipulation assembly 4 (in particular, by the moving device 11).

Additionally or alternatively, the manipulation assembly 4 comprises a (further) magnet (permanent magnet and/or an electromagnet), arranged at the seat 5 arranged at the collecting device 10, in particular at one end of the seat 5 positioned at the collecting device 10. More in particular, the magnet is arranged at the end 8, more in particular of the opening 8'. In these cases, the magnet improves the removal of undesired (magnetic) components from the sample 2.

According to some non-limiting embodiments, the manipulation assembly 4 also comprises a feeder F (for example illustrated in FIG. 11), which is adapted to feed to the container 6 a substance (in particular, liquid), such as for example a reactant and/or a buffer solution. The feeder F is particularly useful when the implementation of additional treatments is desired (apart from mere reduction of the volume) on the sample 2 (e.g. staining and/or permeabilization and/or washing and/or fixing of the microparticle/s 18).

Figure 5:
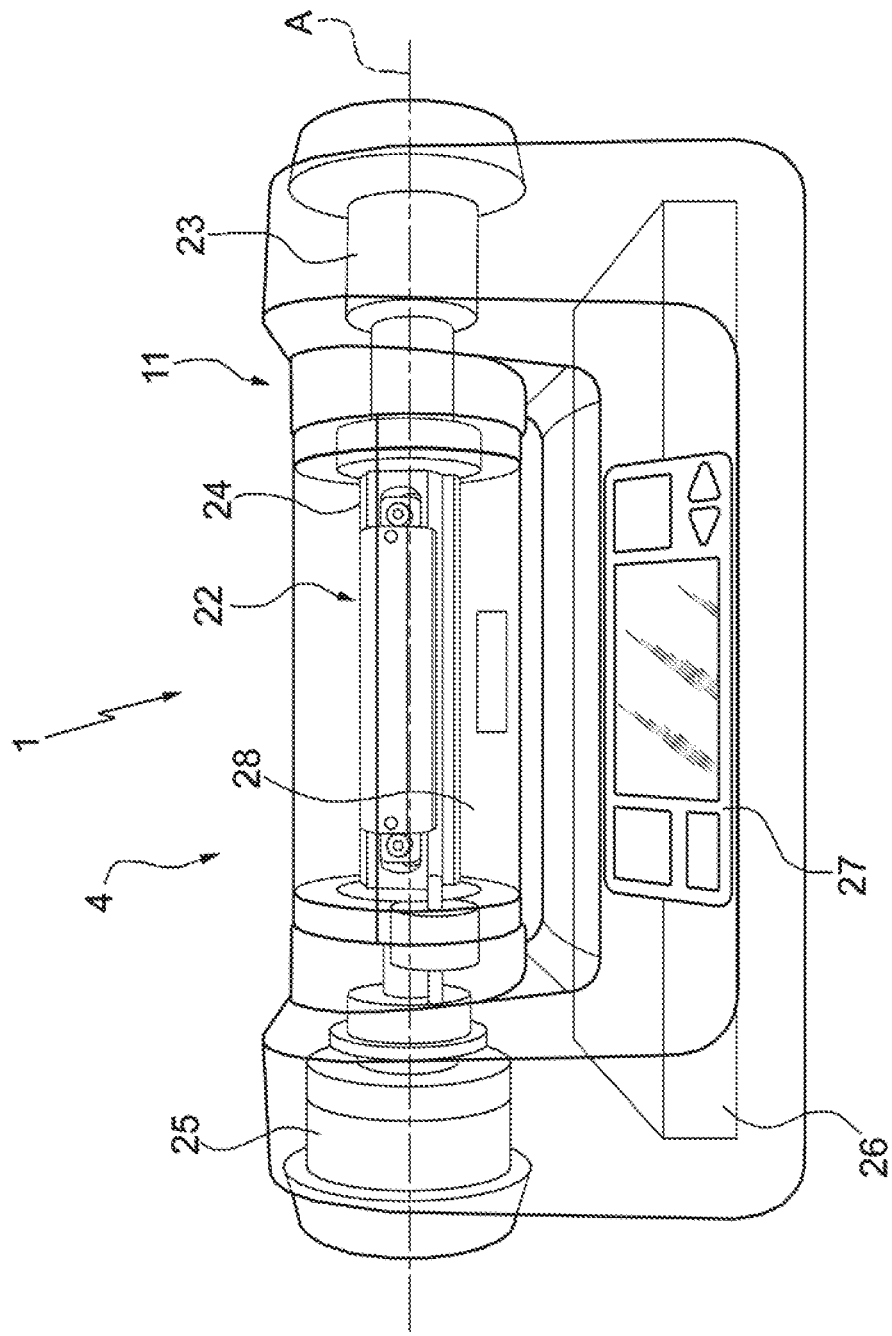
FIG. 5 is a front schematic view, with some parts shown transparently, of a further embodiment of an apparatus in accordance with the present invention.
Figure 6:
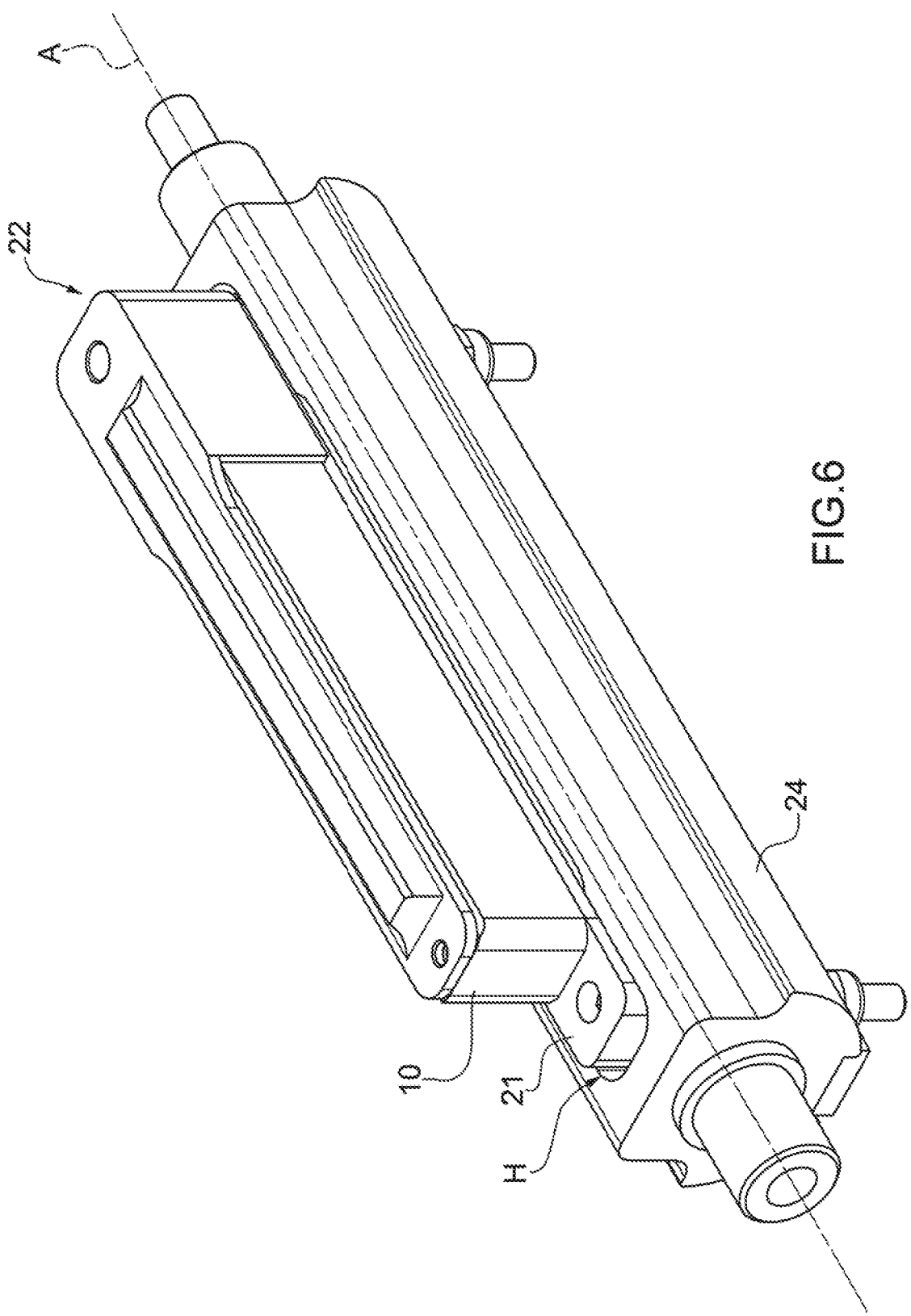
FIG. 6 is a perspective view of a part of the apparatus of FIG. 5.
Figure 7:
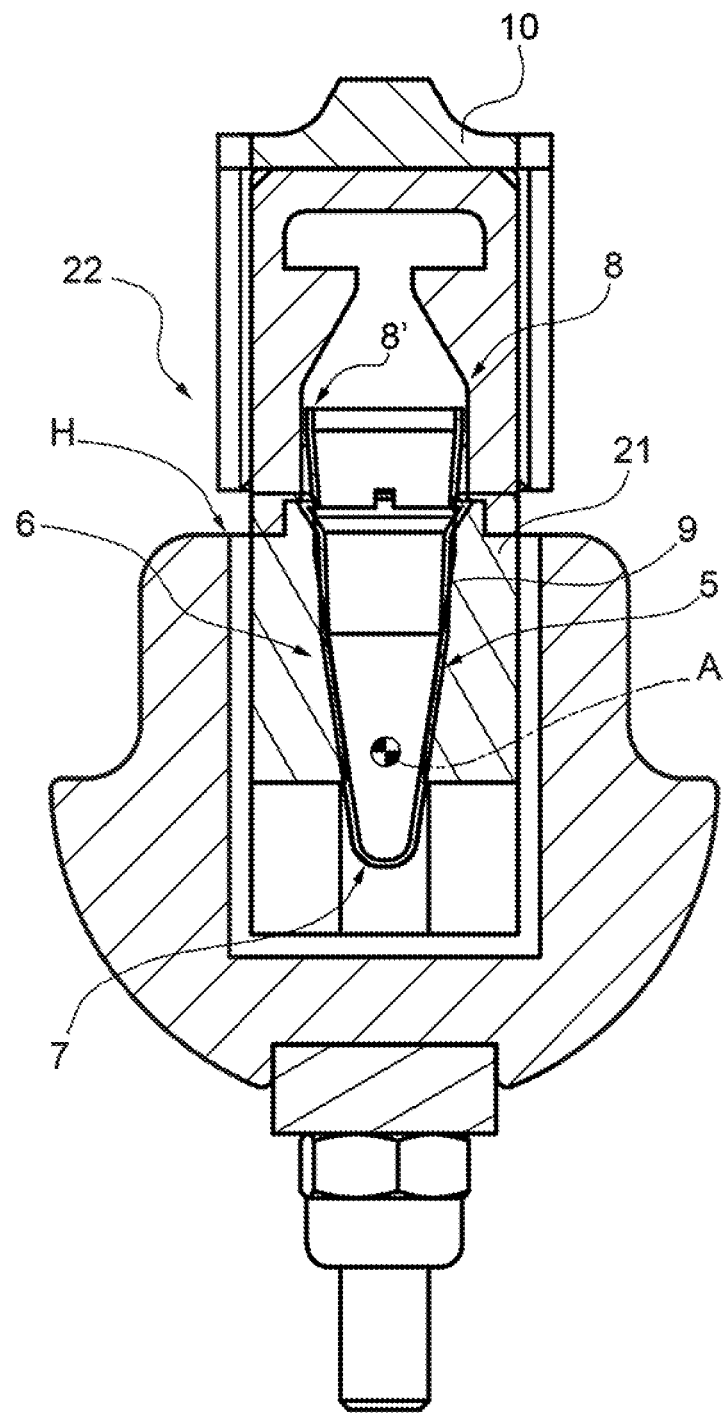
FIG. 7 is a cross section of the part of FIG. 6.

With reference to FIG. 5, in particular, the moving device comprises a motor 23 and an actuator 24 (linear or rotating). In the embodiments of FIGS. 1 to 8, the actuator 24 is a rotor and has a housing H for the cartridge 22.

Advantageously but not necessarily, the moving device 11 also comprises a brake 25, which is adapted to block the movement of the seat 5 (in particular, of the actuator 24).

In particular, the manipulation assembly 4 also comprises a control unit 26 (FIG. 5), which is adapted to control the operation of the motor 23 (and if necessary of the brake 25). More precisely, the control unit 26 is adapted to adjust operation of the motor 23 (and if necessary of the brake 25) based on the final volume of the sample 2 to be obtained (and/or the characteristics of the test tubes and/or of the liquid).

Advantageously but not necessarily, the control unit 26 is connected to the above-mentioned sensor to detect the presence (and/or the correct positioning) of the cartridge 22 and is adapted to control the motor 23 (and if necessary the brake 25) based on the data detected by the sensor. More precisely, if the sensor does not detect the presence of the cartridge 22 or it detects incorrect positioning of the cartridge 22, the motor 23 is not operated (by the control unit 26).

Advantageously but not necessarily, the control unit 26 also controls the operation of the feeder F.

Advantageously but not necessarily, the control unit 26 is connected to the above-mentioned reading and/or writing device and is adapted to control the motor 23 (and if necessary the brake 25) based on the data detected by the reading and/or writing device. More precisely, if the reading and/or writing device detects that the cartridge 22 is not being used for the first time, the control unit 26 does not operate the motor 23.

According to some non-limiting embodiments, the manipulation assembly 4 comprises an operator interface 27 (HMI), provided for example with a touch screen and/or with physical push-buttons.

Advantageously but not necessarily, the manipulation assembly also comprises a cover 28, which moves between an opening position and a closing position.

When the cover 28 is in the opening position, the container 6 (more precisely, the cartridge 22) can be inserted in and removed from the moving device 11. In other words, when the cover 28 is in the opening position, the above-mentioned housing H is accessible from the outside.

When the cover 28 is in the closing position, it is not possible to insert and/or remove the container 6 (in particular, the cartridge 22). In other words, the housing H is not accessible from the outside.

Figure 3:
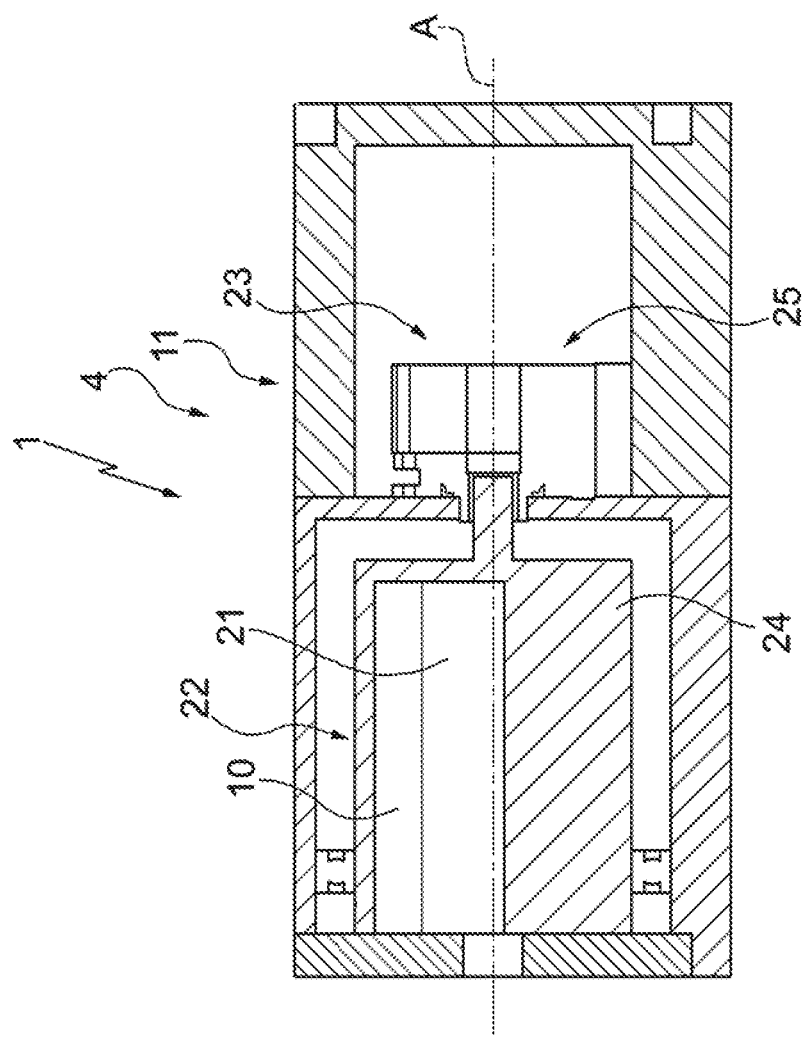
FIG. 3 is a side section of a part of the apparatus of FIG. 1.

According to some non-limiting embodiments (like the one illustrated in FIGS. 1 to 4), the moving assembly comprises a housing H which slides between an outer position (FIG. 1) and an inner position (FIGS. 2 and 3).

In these cases, in use, the container 6 (more precisely, the cartridge 22) is inserted in the housing H arranged in the outer position. At this point, the housing H is moved (with the container 6—more precisely the cartridge 22) to the inner position. In the inner position the housing, in use, is caused to rotate around the axis A.

The embodiment of FIGS. 1 to 4 differs from the embodiment of FIGS. 5 to 8, since the motor 3 and the brake 25 are on the same side as the actuator 24 (which also in this case is a rotor—see in particular FIG. 3).

According to some non-limiting embodiments (FIG. 20), the container 6 is a test tube of traditional type (for example PCR test tubes).

Advantageously but not necessarily (FIG. 21), the container 6 has a portion arranged at the closed end 7 with a reduced inner section (relative to a traditional test tube—in particular, said section has a radius of less than 0.8 mm; more precisely, the radius is approximately 0.5 mm) and has a substantially cylindrical shape. This type of geometry offers various advantages, including: the possibility of obtaining a smaller final volume of the sample 2; and a further increase in the reproducibility of the volume reduction.

Advantageously but not necessarily (FIG. 22), the container has an inner narrowing 29 near the closed end 7. In particular, the inner volume of the part of the container 6 arranged between the narrowing 29 and the closed end 7 is smaller than the starting volume of the sample 2 and greater than the final volume to be obtained of the sample 2.

This type of geometry reduces the risk of the microparticle 18 flowing out of the container 6.

According to an aspect of the present invention, a method is provided for reduction of the volume of a sample 2 comprising at least one (at least partially) liquid component 3 and having a volume up to 10 mL (in particular, up to 2 mL).

The method provides for the use of at least one container 6 as defined above.

The method comprises an acceleration step, during which a manipulation assembly 4 moves the container 6 containing the sample 2 so as to subject the container to an acceleration (having at least one component) orientated from the end 8 towards the closed end 7 and transverse (in particular, perpendicular) to the opening 8' so that a first part of the (at least partially) liquid component 3 flows out of the container 6 passing through said opening 8' and a second part of the (at least partially) liquid component 3 (in particular, with a substantially defined volume) remains in the container 6, in particular at the closed end 7.

Advantageously but not necessarily, the method is implemented by the apparatus 1 described above.

Advantageously but not necessarily, the sample 2 comprises at least one microparticle 18 (in particular, a plurality of microparticles 18). During the acceleration step, the manipulation assembly 4 subjects the container 6 to the acceleration so that the microparticle 18 remains in the container 6, in particular at the closed end 7.

Advantageously but not necessarily, the method comprises a pre-treatment step, which is prior to the acceleration step and during which the container 6 containing the sample 2 undergoes a further acceleration (having at least one component) orientated from the closed end 7 towards the end 8 (and transverse—in particular, perpendicular—to said opening 8') so that the microparticle 18 is arranged at the closed end 7, in particular in contact with the inner surface 30 of the container 6. In particular, the pre-treatment step entails centrifuging the container 6 containing the sample 2.

It has been experimentally observed that, in this way, the risk of the microparticle 18 flowing out of the container 6 during the acceleration step is further reduced.

In this regard, it should be noted that between the microparticle 18 and the inner surface 30 an adhesion force Fa is created that counters the inertial force Fic which is applied to the microparticle 18 during the acceleration step.

Figure 28:
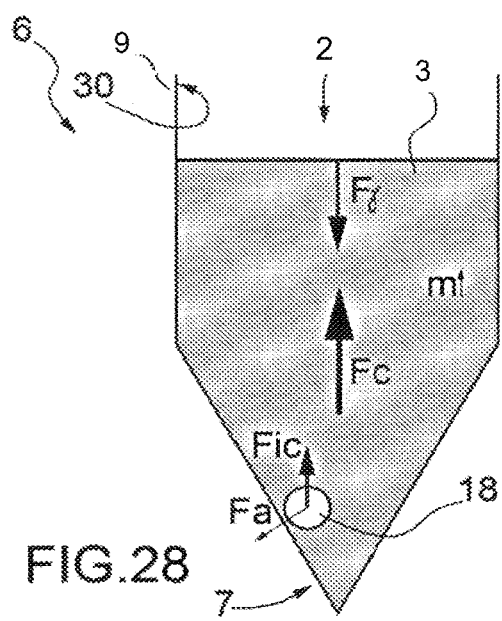
FIGS. 28 and 29 schematically illustrate some of the forces present during the implementation of the present invention.
Figure 29:
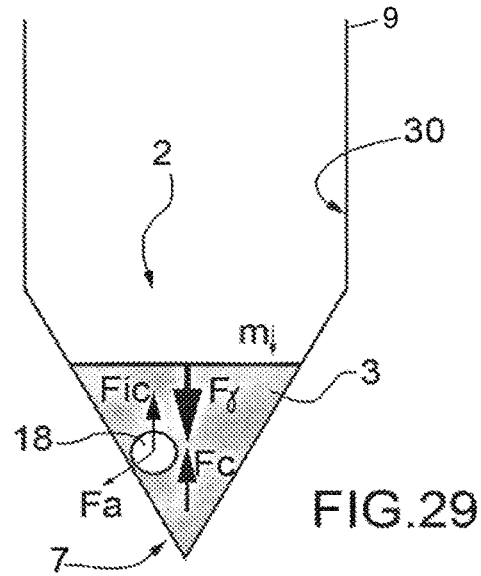

The above is illustrated in FIGS. 28 and 29, which show an attempt to explain what has been observed experimentally.

FIG. 28 shows the container 6 and the sample 2 at the beginning of the acceleration step. FIG. 29 shows the container 6 and the sample 2 at the end of the acceleration step.

In these figures the inertial force applied to the sample 2 is based on the quantity of sample 2 and is indicated as Fc, and the retaining force, which maintains the surface of the sample intact (and is linked to the surface tensions at play), is indicated as Fγ.

In particular, according to some embodiments, during the acceleration step, as a consequence of the acceleration applied to the container 6, at least one first inertial force is exerted on the first part of the sample 2 and at least one second inertial force is exerted on the second part of the sample 2. The first and the second inertial force are orientated from the closed end 7 towards the end 8 (transversally—in particular, perpendicularly) to the opening 8'. During the acceleration step, the first inertial force is greater than a first retaining force exerted between the first part of the sample and the container 6, and the second inertial force is smaller than a second retaining force exerted between the second part of the sample and the container 6. In particular, the first and the second retaining force are (mainly) determined by the surface tension of the sample 2 and the surface tension between the sample 2 and the container 6 (more precisely, the side wall 9 of the container 6).

In the more detailed description below and in FIGS. 23-29, the retaining force is indicated as Fγ.

Advantageously but not necessarily, the manipulation assembly 4, during the acceleration step, subjects a plurality of containers 6 (each containing a respective sample 2) to the above-mentioned acceleration simultaneously. In particular, the manipulation assembly 4 comprises a plurality of seats 5, each of which houses a respective container 6.

Figure 9:
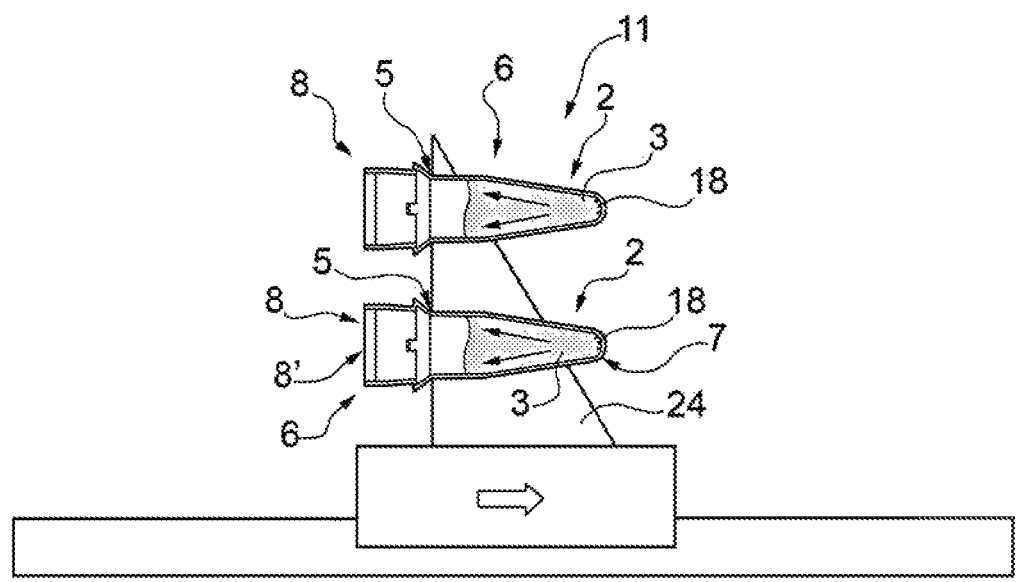
FIG. 9 is a schematic side view of a part of a further embodiment of an apparatus in accordance with the present invention.
Figure 25:
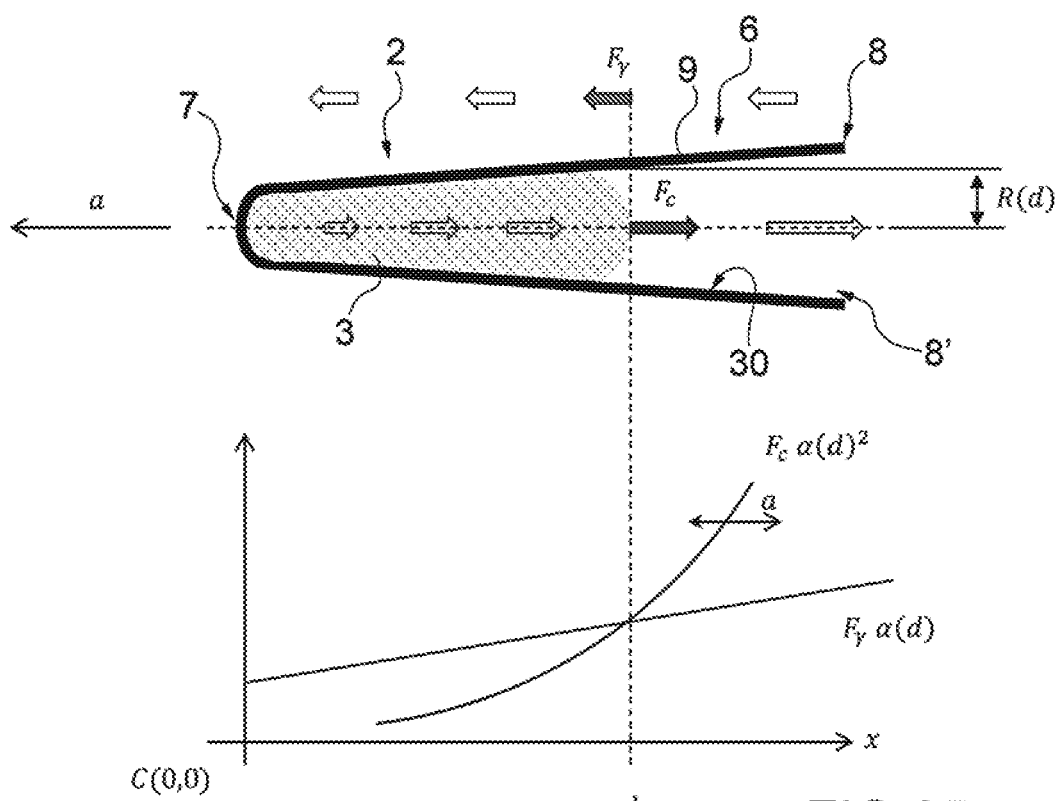
FIG. 25 schematically illustrates some of the forces present during implementation of the present invention; the X axis shows the distance relative to the end of the container, the Y axis shows the forces.

According to some non-limiting embodiments, the manipulation assembly 4 comprises a moving device 11 which, during the acceleration step, imparts to the container 6 a substantially linear movement in a given direction such that the closed end 7 faces forward relative to the given direction and the end 8 faces backward relative to the given direction (FIGS. 9 and 25).

According to alternative embodiments, the manipulation assembly 4 comprises a moving device 11 which, during the acceleration step, rotates the container 6 around a rotation axis A so that the centrifugal force moves the first part of the (at least partially) liquid component 3 out of the container 6 passing through the opening 8'.

In particular, during the acceleration step, the container 6 is orientated substantially radially relative to the axis A so that the end 8 faces outwards.

Advantageously but not necessarily, the rotation axis A extends through the container 6 between the closed end 7 and the end 8. In this way, during the acceleration step, it is substantially not possible for the container to empty beyond the limit defined by the position of the axis A (in other words, below the axis A). In these cases, by selecting the position in which the axis A passes through the container 6, it is possible to adjust the volume of the part of the (at least partially) liquid component 3 which remains in the container 6.

According to alternative non-limiting embodiments, during the acceleration step, the closed end 7 is arranged between the rotation axis A and the end 8. In this way (as explained in further detail below), the volume of the second part of the liquid component 3 is based on the angular speed of the container 6, during the acceleration step.

According to some non-limiting embodiments, the microparticles are chosen from the group consisting of: cells, cellular debris (in particular, cellular fragments—e.g. DNA and/or RNA), cellular aggregates (such as, for example, small clusters of cells deriving from stem cells like neurospheres or mammospheres), bacteria, lipo-beads, micro-beads (made of polystyrene and/or magnetic), nano-beads (e.g. nano-beads up to 100 nm,) complexes formed of micro-beads (in particular, magnetic; in particular with largest dimension smaller than 500 μm) bound to cells, circulating tumour cells bound to ferrofluid, exosomes, colloidal suspensions (e.g. ferrofluid), liposomes, nuclei, spores, and a combination thereof.

In particular, the microparticles 18 are chosen from the group consisting of: stem cells, erythroblasts, trophoblasts, neuronal cells, epithelial cells, tumour cells, white blood cells (WBC), stromal cells, sperm cells, circulating tumour cells (CTC), fetal cells, micro-beads (in particular with largest dimension smaller than 500 μm), colloidal suspension (e.g. ferrofluid), complexes formed of micro-beads bound to cells (e.g. stem cells, erythroblasts, trophoblasts, neuronal cells, epithelial cells, tumour cells, white blood cells (WBC), stromal cells, sperm cells, circulating tumour cells (CTC), fetal cells), erythrocytes, circulating tumour cells bound to ferrofluid and a combination thereof.

Advantageously but not necessarily, the method comprises an adjustment step, which is prior to the acceleration step and during which a calculated acceleration (and/or calculated angular speed) is determined (by the control unit 6) based on the substantially defined volume to be obtained (and in particular the geometry of the container and the interaction constant between the material composing said side wall and said liquid component). During the acceleration step, the acceleration to which the manipulation assembly 4 subjects the container 6 is the calculated acceleration (and/or the angular speed to which the manipulation assembly 4 subjects the container 6 is the calculated angular speed).

It should be noted that in reality, the angular speed and acceleration are (for circular motions) equivalent since they are bound by the relation $a_c = \omega^2 \times d$, in which $a_c$ is the centrifugal acceleration, $\omega$ is the angular speed and d is the distance from the rotation axis.

According to some non-limiting embodiments, the method comprises an insertion step, during which the sample 2 is inserted in the container 6.

In particular, during the insertion step, the sample 2 is inserted in the container 6 by means of an instrument chosen from the group consisting of: microfluidic devices (e.g. comprising a jet system—in particular, derived from the inkjet technology), pipetting instruments, flow cytometers, micromanipulators, optical tweezers. According to some non-limiting embodiments, the microfluidic devices are of the types described in the patent applications with publication number WO2010/106434 and WO2012/085884.

Advantageously but not necessarily, the sample 2 is selected so as to comprise at least one microparticle 18 using: images, immuno-fluorescence, impedance, dimensions, geometry, morphological features and a combination thereof.

According to specific non-limiting embodiments, a microfluidic device is used, which selects the sample containing at least one microparticle 18 (of a given type) using: images, immuno-fluorescence, impedance, dimensions, geometry, morphological features and a combination thereof.

In some cases, it is also possible to provide a treatment step, which is subsequent to the insertion step and prior to the centrifugation step and during which the sample is treated, in particular with a further substance.

According to some non-limiting embodiments, the further substance is a reactant (e.g. to stain and/or make permeable the microparticles 18), which is inserted in the container. Alternatively or additionally, the reactant is a reactant to fix the microparticles 18.

It is also possible to provide a washing step, during which a washing liquid (a washing solution—a washing buffer) is inserted in the container 6 and then removed during the acceleration step.

In particular, the treatment step comprises a first addition sub-step, during which a reactant (in particular, a reactant to stain and/or a reactant to make the microparticles 18 permeable) is inserted in the container 6 containing the sample 2; and a second addition sub-step, during which a washing liquid is inserted in the container 6 containing the sample 2. In particular, which is subsequent to the first addition sub-step.

According to some non-limiting embodiments, the treatment step comprises an incubation sub-step which is subsequent to the first addition sub-step and prior to the second addition sub-step and during which the reactant is maintained in the container 6 together with the sample 2 (in particular, at a controlled temperature between a minimum and a maximum temperature).

According to some non-limiting embodiments, the incubation sub-step has a duration ranging from 10 seconds to 24 hours.

FIG. 33 illustrates a flow chart of procedures that can be followed. In these cases, the method comprises the pre-treatment step SA (as described above) and the acceleration step SB, subsequent to the pre-treatment step. The method also provides the treatment step, which is subsequent to the acceleration step SB and comprises an addition sub-step SC and usually an incubation sub-step SD during which the further substance is maintained in the container 6 in contact with the sample 2; a washing step SE, which is subsequent to the treatment step (more precisely, subsequent to the incubation sub-step SD) and during which a washing liquid is inserted in the container 6.

At this point (after the washing step), according to a first option, the pre-treatment step SA is scheduled again (and therefore, again in succession steps SB, SC, SD). In accordance with a second option, the acceleration step (SB) is scheduled again (and therefore, again in succession the steps SC, SD). The procedure can be carried out several times (and normally ends with an SB step).

Advantageously but not necessarily, during the acceleration step the temperature of the containers 6 is maintained within a predefined interval. In particular, the manipulation assembly 4 comprises a system for maintaining a temperature adapted to maintain the temperature of the containers 6 (more precisely, of the seats 2) within the desired interval. According to some non-limiting embodiments, the system for maintaining the temperature comprises a temperature sensor and a heating and/or cooling device, which operates based on the data detected by the temperature sensor.

The adjustment step can be implemented by using the experimental data previously acquired (which for example indicate that with a given container 6—of a given shape and a given material—with a given component 3 and applying a given acceleration—and/or angular speed—a given final volume is obtained). An example of a curve obtained with experimental data acquired which relates the angular speed with the volume of the second part of the liquid component 3 (which remains in the container after the acceleration step) is illustrated in FIG. 32.

In particular (therefore), the adjustment step is, in some cases, preceded by a calibration step, during which the different values of the final volumes obtained for different accelerations (and/or angular speeds) are measured. More in particular, during the calibration step a calibration curve (or a calibration function) is created which is then used during the adjustment step to obtain the calculated acceleration (and/or the calculated angular speed) on the basis of the substantially defined volume to be obtained.

Alternatively or additionally, during the adjustment step, a first function that binds an inertial force to the acceleration is crossed with a second function of the force due to the surface tensions and it is estimated (also graphically) for which acceleration value (and/or angular speed) these two forces are equivalent for the volume of the second part of the (at least partially) liquid component 3 desired. In other words, during the adjustment step, after identifying the volume of the second part of the (at least partially) liquid component 3 to be left in the container 6, it is estimated for what acceleration value (and/or angular speed) the inertial force is equivalent to the force due to the surface tensions on the basis of a first function that relates the inertial force to the acceleration (and/or the angular speed) and a second function that relates the inertial force to the distance from the closed end 7 or from the axis A.

During the acceleration step the manipulation assembly subjects the container 6 to acceleration with said value.

If the closed end 7 is arranged between the axis A and the end 8, and the section of the container 6 is constant (as illustrated in FIG. 23), the first function is:

$$F_c(d) \propto m\omega^2 d \qquad (1)$$

the second function is $$F_\gamma \propto 2\pi R \Delta\gamma \qquad (2)$$

in which $F_c$ is the inertial force (more precisely the centrifugal force); m is the mass of the sample; ω is the angular speed; d is the distance from the axis A; $F_\gamma$ is the retaining force (due to the surface tensions); R is the internal radius of the container 6 and Δγ is a parameter that depends on the type of sample 2 (more precisely, on the type of liquid component 3) and on the material from which the container 6 is made. The parameters Δγ can be found tabulated in handbooks or can be determined experimentally.

In this case, the volume of the second part of the (at least partially) liquid component 3 (namely the part that remains in the container after the acceleration step) is based (maintaining the internal perimeter of the container, the mass and the surface tension fixed) on the angular speed (and, therefore, can be modulated by varying the angular speed). More precisely, when the angular speed is increased, the volume is reduced.

Figure 24:
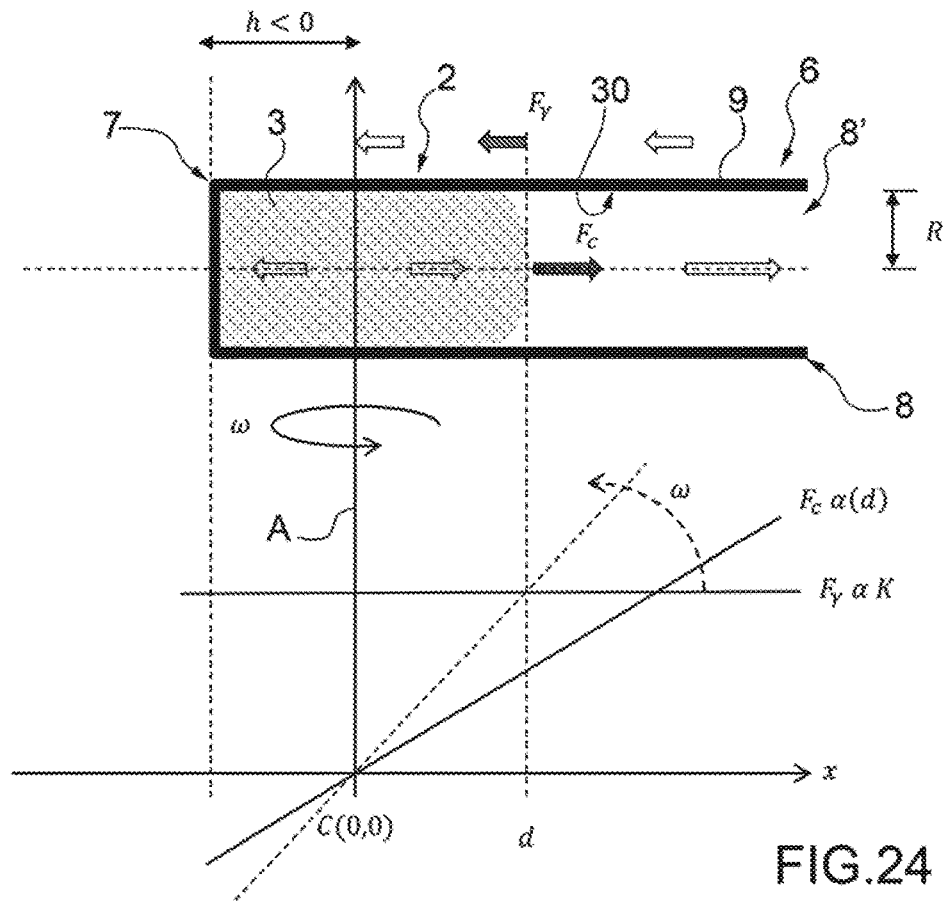

If the axis A passes through the container 6 and is arranged between the closed end 7 and the end 8, and the section of the container 6 is constant (as illustrated in FIG. 24), the first and the second function are the functions (1) and (2) reported above. Unlike the previous situation, in this case it is not possible (by increasing the angular speed) to cause the entire sample 2 to flow out, since the part arranged between the axis A and the closed end 7 remains (in any case) inside the container 6.

If the container 6 has a variable diameter and is moved in a linear manner (as illustrated in FIG. 25), the second function is the function (2) (note, however, that in this case the internal perimeter of the container 6—and therefore the internal radius R—varies as it moves along the longitudinal extension of the container 6) and the first function is:

$$F_c \propto ma \propto \beta \cdot d^2 \qquad (3)$$

in which $F_c$ is the inertial force; m is the mass of the sample 2; a is the acceleration; d is the distance relative to the closed end 7; β is a proportionality factor that depends on the specific weight of the sample 2 (more precisely, of the liquid component 3) and the geometry of the container 6 (and can therefore be determined beforehand).

If the closed end 7 is arranged between the axis A and the end 8, and the section of the container 6 is variable (as illustrated in FIG. 26), the second function is the function (2) (note, however, that in this case the internal perimeter of the container 6—and therefore the internal radius R—varies as it moves along the longitudinal extension of the container 6) and the first function is:

$$F_c(d) \propto \beta \cdot d^2 \omega^2 \qquad (4)$$

in which $F_c$ is the inertial force; ω is the angular speed; d is the distance from the axis A; β is a proportionality factor which depends on the specific weight of the sample 2 (more precisely, of the liquid component 3) and the geometry of the container 6 (and can, therefore, be determined beforehand).

In particular, the function (4) is obtained from $$F_c(d) \propto m\omega^2 d \propto p\pi R^2 \omega^2 d \qquad (5)$$

in which p is the specific weight of the sample.

Figure 27:
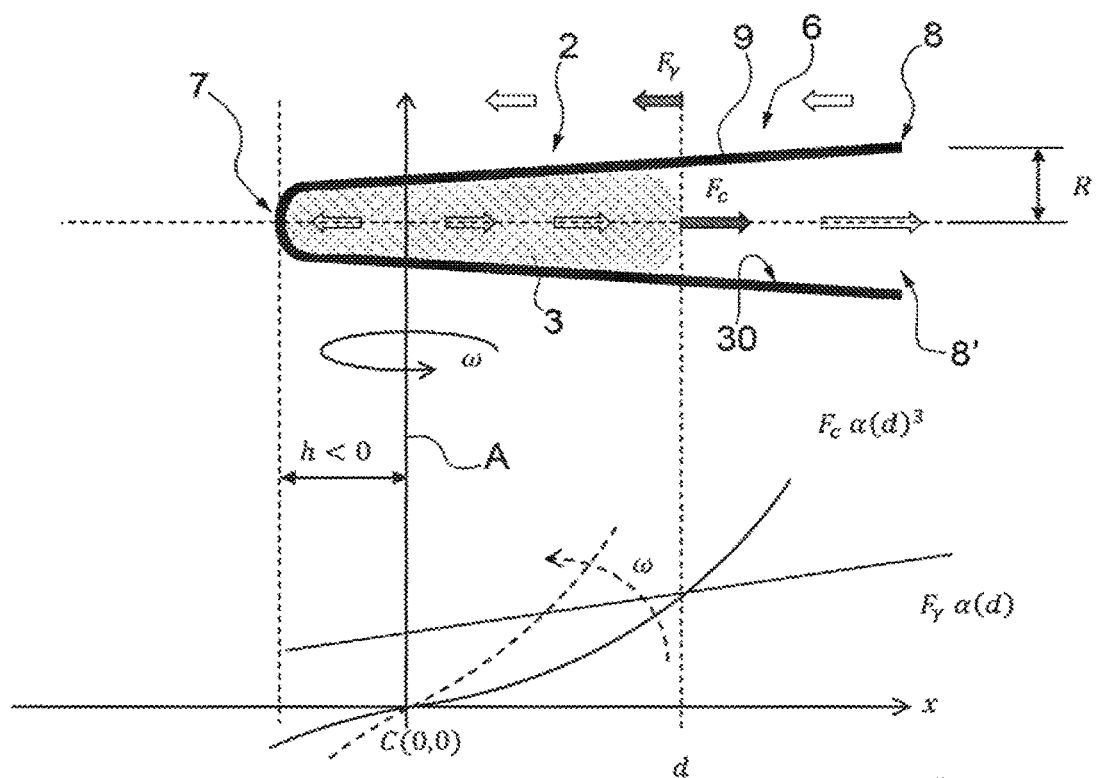

If the closed end 7 is arranged between the axis A and the end 8, and the section of the container 6 is variable (as illustrated in FIG. 27), the second function is the function (2) (note, however, that in this case the internal perimeter of the container 6—and therefore the internal radius—varies as it moves along the longitudinal extension of the container 6) and the first function is the function (4). Unlike the previous situation, in this case it is not possible (by increasing the angular speed) to cause all the sample 2 to flow out, since the part arranged between the axis A and the closed end 7 remains in the container 6.

In view of the above, the first function is the function (1) or (3) or (4) and the second function is the function (2). This is particularly important when the closed end 7 is arranged between the axis A and the end 8.

It should be noted that the functions (1)-(5) and the illustrations of FIGS. 23-27 were formulated (to rationalize what was observed and automate some embodiments) after the present invention had experimentally surprisingly demonstrated that it could obtain in an extremely accurate and repeatable manner the reduction of the volume of the sample 2.

According to some non-limiting embodiments, the sample 2 is obtained from a preliminary sample comprising the microparticle/s 18 and further microparticles. In particular, the sample 2 is obtained by selectively recovering the microparticle/s 18 relative to further microparticles. This is done by using a separation unit comprising a system chosen from the group consisting of: dielectrophoresis, optical tweezers, magnetophoresis, acoustophoresis, travelling waves, thermal flow, local fluid movements generated by electro thermal flow, local fluid movements generated by electro hydrodynamic forces and a combination thereof.

In some non-limiting cases, the separation unit comprises a system chosen from the group consisting of: dielectrophoresis, optical tweezers, magnetophoresis, acoustophoresis and a combination thereof.

In particular, the separation unit comprises a system able to exert a force directly on the microparticle/s 18 (in particular, without the force being exerted on the fluid, which transfers the movement to the microparticle/s 18).

According to specific embodiments, the separation unit comprises a dielectrophoresis unit (or system) as described, for example, in at lest one of the patent applications WO-A-0069565, WO-A-2007010367, WO-A-2007049120. More in particular, the separation unit functions in accordance with what is described in the patent applications with publication number WO2010/106434 and WO2012/085884).

Advantageously but not necessarily, the separation unit is part of one of the microfluidic devices cited above and, in particular, in accordance with what is described in the patent applications with publication number WO2010/106428 and WO2010/106426. Said microfluidic system is used to obtain the sample 2 from a preliminary sample.

According to some non-limiting embodiments, during the acceleration step, a magnetic force is exerted on the microparticle 18, in particular provided with at least one magnetic component, towards the closed end 7 (and/or the side wall 9).

Alternatively (or additionally), during the acceleration step, a (further) magnetic force is exerted towards the opening 8'. In particular, said magnetic force is exerted on a colloidal suspension of ferrofluid (so as to favour the outflow of the colloidal suspension from the container 6).

The method and the apparatus in accordance with the present invention can also be advantageously used to prepare samples for genetic analyses, to prepare samples for cell sorting, for cell staining and for cell washing.

Unless explicitly specified otherwise, the contents of the references (articles, books, patent applications etc.) cited in this text are fully referred to herein. In particular the mentioned references are incorporated here for reference.

Further characteristics of the present invention will become clear from the following description of merely illustrative non-limiting examples.

Example 1

Figure 20:
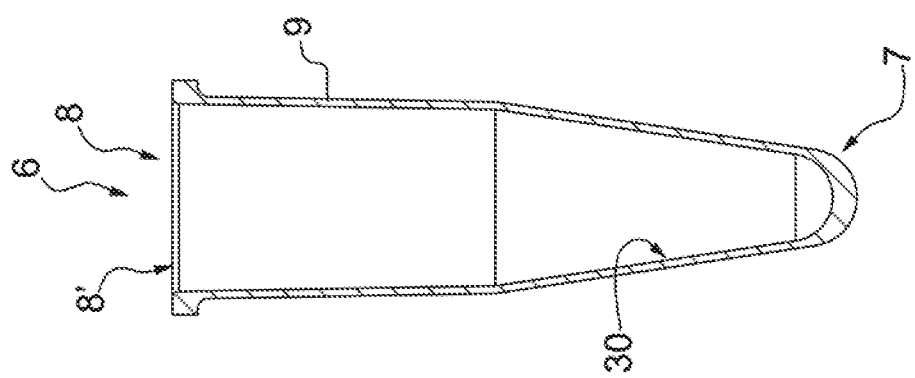

This example describes tests carried out with a traditional method of volume reduction of samples 6 comprising a liquid component 3 and at least one microparticle 18. Said samples had been previously treated with a centrifuge to favour the positioning of the microparticle 18 at the closed end 7 of the container 6 (a test tube as illustrated in FIG. 20).

In particular, 260 tests overall were performed by three different operators (A, B and C) who, starting from samples 6 with an initial volume of approximately 113 µL, had to obtain a volume of 1 µL.

Each operator collected the excess liquid manually using a pipette (and inclining the test tube containing the sample).

The operators A and B performed 90 reduction operations each. The operator C performed 80 reduction operations.

Figure 31:
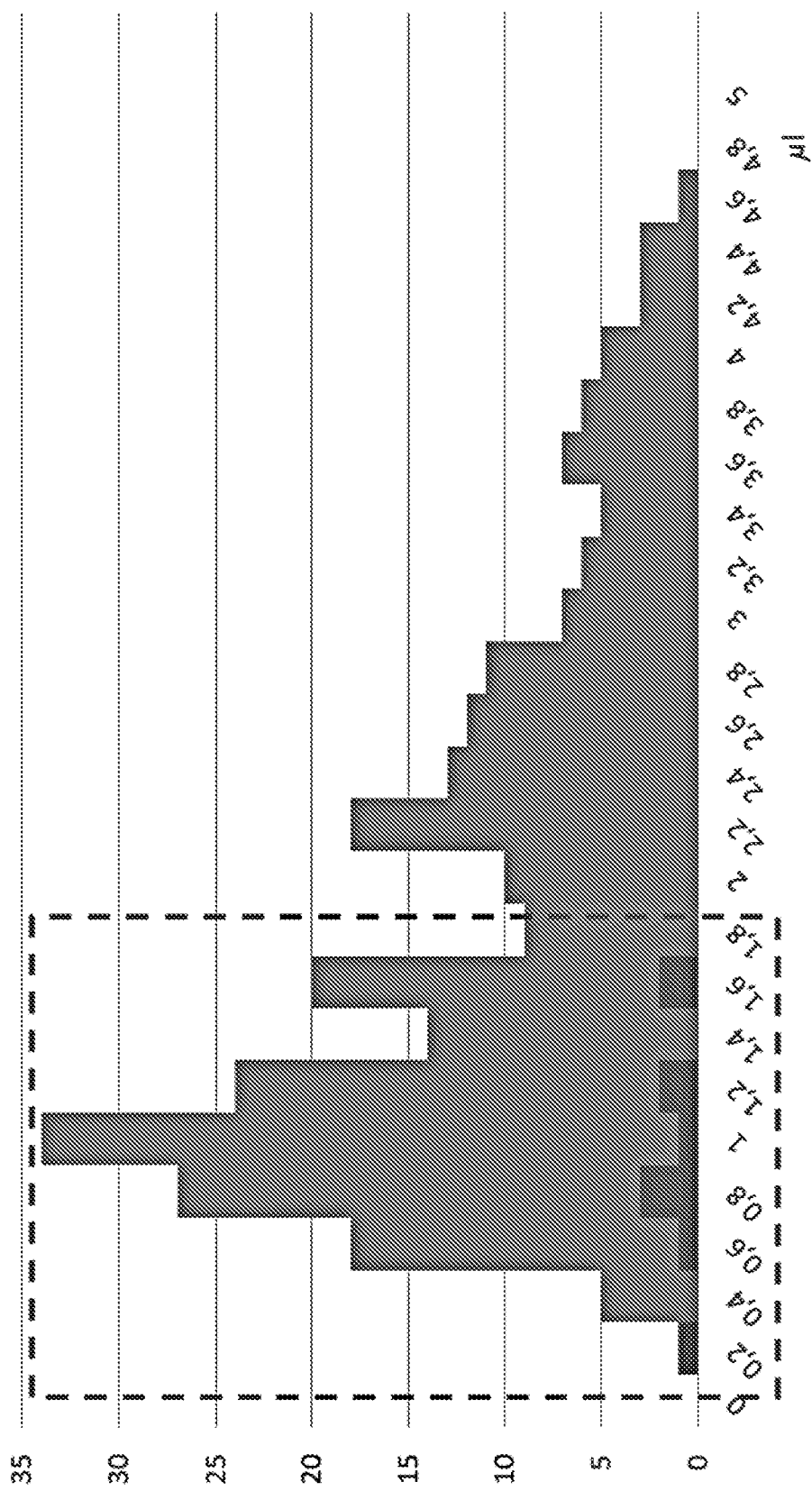
FIG. 31 is a graphic representation of the experimental results obtained using a method of the state of the art; the X axis indicates the volumes (in μL) of the samples obtained; the Y axis indicates the frequency (the number of times) with which said volume was obtained.

To complete the operations, 10 hours of work were required (adding together the work time of each operator). The overall results obtained are given in table 1 and in FIG. 31 (the X axis shows the volume of the sample obtained after reduction and the Y axis shows the number of times the reduced sample presented that volume), in which a darker colour highlights the times when the microparticle was lost and the broken line identifies the region in which (for what final volumes) said losses occurred.

TABLE 1

| Manual volume reductions: 260 tests | |
|---|---|
| Mean | 1.73 µl |
| Maximum interval | 4.3 µl |
| Standard deviation | 1.03 µl |
| Success rate | 94.7% |

By maximum interval we mean the difference between the maximum volume and the minimum volume obtained after the reduction operations. The mean is the mean of the volumes of the samples obtained after the reduction. The results obtained show that the traditional procedure is not reliable (the failure rate—relative to the cases in which the microparticle 18 was lost—is not negligible) and the mean volume is significantly higher than the target volume (1 µL).

The results obtained divided per operator are given in the following tables 2-4.

TABLE 2

| Operator A | |
|---|---|
| Mean | 2.65 µl |
| Maximum interval | 3.35 µl |
| Standard deviation | 0.79 µl |
| Success rate | 98.9% |

TABLE 3

| Operator B | |
|---|---|
| Mean | 1.16 µl |
| Maximum interval | 2.60 µl |
| Standard deviation | 0.51 µl |
| Success rate | 94.7% |

TABLE 4

| Operator C | |
|---|---|
| Mean | 1.28 µl |
| Maximum interval | 4.06 µl |
| Standard deviation | 0.96 µl |
| Success rate | 89.9% |

These results show that the precision of the procedure is extremely dependent on the operator and his/her manual abilities.

Figure 30:
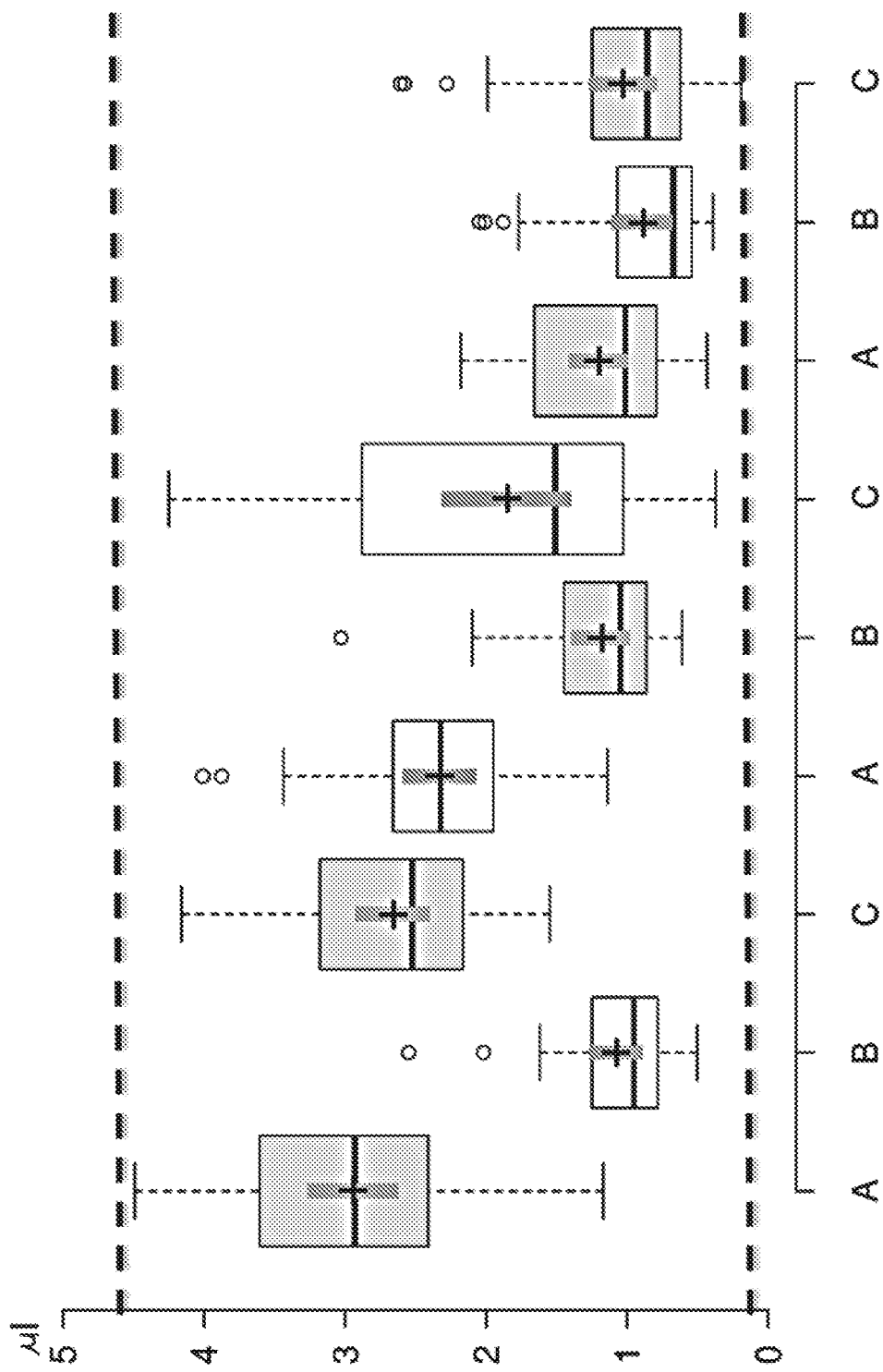
FIG. 30 is a graphic representation of the experimental results obtained using a method of the state of the art; the X axis shows an identification of the operator who performed the tests; the Y axis shows the volumes (in μL) of the samples obtained.

It should be noted that each operator performed the reductions in three separate sessions. The results obtained by each operator (indicated on the X axis) for each section are graphically shown in FIG. 30 (the Y axis shows the volume of the sample obtained after the reduction).

As can be seen, even one single operator tends to obtain different results in different moments.

Example 2

This example describes the comparison between tests performed with a traditional volume reduction method and a (automatic) method in accordance with the present invention. The tests were performed with an initial volume of approximately 113 μL and the target volume was 1 μL.

The traditional method was implemented as described in example 1.

For the method in accordance with the present invention, the apparatus 1 was used (made to operate at a speed of 4200 RPM) illustrated in FIGS. 5-8 and the container of FIG. 20 (more precisely, a strip of PCR test tubes with volume of 0.2 mL each). The distance between the axis A (which passed through the container) and the closed end 7 was 2.22 mm. The results obtained are given in table 5.

TABLE 5

|  | Manual | Automatic |
|---|---|---|
| Number of reduced samples | 360 | 180 |
| Mean | 1.66 μL | 1.22 μL |
| Maximum interval | 4.34 μL | 1.05 μL |
| IQR | 1.31 μL | 0.30 μL |
| Standard deviation | 0.95 μL | 0.25 μL |
| Success rate | 92.8% 1 particle lost every 10 samples | 99.4% 1 particle lost every 180 samples |

From the data indicated above, the present invention represents a significant and unexpected improvement in each aspect recorded.

Table 6 below compares the same number of tests performed with the traditional method and with the method in accordance with the present invention.

TABLE 6

|  | Manual | Automatic |
|---|---|---|
| Number of reduced samples | 96 | 96 |
| Time taken | 220 minutes | 15 minutes |
| Mean | 1.66 μL | 1.21 μL |
| Standard deviation | 0.95 μL | 0.25 μL |
| Success rate | 92% | 98% |

It can be immediately observed that the time required to obtain the samples with reduced volume is dramatically lowered by implementing the method of the present invention.

The invention claimed is:

1. A method for the reduction of the volume of a sample comprising at least one at least partially liquid component and having a volume up to 10 mL using at least one container having an inner space, a first closed end, a second end provided with an opening, which establishes a connection between the inner space and the outside, and at least one side wall, the method comprising:
an acceleration step, during which a manipulation assembly moves the container containing the sample subjecting the container to an acceleration which has at least one component that is orientated from the second end towards the first closed end and is transverse to said opening, so that a first part of said at least partially liquid component flows out of the container flowing through said opening and a second part of said at least partially liquid component with a substantially defined volume remains in the container, in particular at said first closed end;
wherein the manipulation assembly comprises a moving device, which, during the acceleration step, rotates the container around a rotation axis so that the centrifugal force causes said first part of said at least partially liquid component to flow out of the container going through said opening; and
wherein, during the acceleration step, the rotation axis extends through the container between the first closed end and the second end.

2. The method according to claim 1, wherein the sample comprises at least one microparticle; during the acceleration step, the manipulation assembly subjects the container to the acceleration so that the at least one microparticle remains in the container.

3. The method according to claim 2, further comprising a pre-treatment step, which is prior to the acceleration step and during which the container containing the sample is subjected to a further acceleration having at least one component that is orientated from the first closed end towards the second end and is transverse to said opening, so that the microparticle is arranged in the area of the first closed end.

4. The method according to claim 1, wherein, during the acceleration step, as a consequence of the acceleration applied to the container, at least one first inertial force is exerted upon the first part of the sample and at least one second inertial force is exerted upon the second part of the sample; the first and the second inertial forces are orientated from the first closed end towards the second end transversely to said opening; during the acceleration step, the first inertial force is greater than a first retaining force exerted between the first part of the sample and the container, and the second inertial force is smaller than a second retaining force exerted between the second part of the sample and the container.

5. The method according to claim 1, further comprising an adjustment step, which is prior to the acceleration step and during which a calculated acceleration and/or a calculated angular speed are determined based on the substantially defined volume to be obtained; during the acceleration step, the acceleration to which the manipulation assembly subjects the container is the calculated acceleration and/or the angular speed to which the manipulation assembly subjects the container is the calculated angular speed.

6. The method according to claim 1, wherein the manipulation assembly, during the acceleration step, simultaneously subjects a plurality of containers to said acceleration; in particular, the manipulation assembly comprises a plurality of seats, each housing a respective container.

7. The method according to claim 2, wherein the at least one microparticle is selected from the group consisting of: cells, cellular debris, cellular aggregates, bacteria, lipobeads, microbeads, nano-beads, assemblies formed by micro-beads bound to cells, circulating tumour cells bound to ferrofluid, exosomes, colloidal suspension, liposomes, nuclei, spores, and combinations thereof.

8. The method according to claim 1, further comprising an insertion step, during which the sample is inserted into the container; and a treatment step, which is subsequent to the insertion step and prior to the acceleration step and during which the sample is treated with a further substance.

9. The method according to claim 8, wherein the treatment step comprises a first addition sub-step, during which a reactant is inserted into the container containing the sample; and a second addition sub-step, which is subsequent to the first addition sub-step and during which a washing liquid is inserted into the container containing the sample.

10. The method according to claim 1, wherein, during the acceleration step, a collecting device, which collects the first part of said at least partially liquid component, is arranged in the area of the opening out of the container.

11. The method according to claim 10, wherein the collecting device comprises a retaining system to hold back at least a fraction of the first part of said at least partially liquid component.

12. The method according to claim 1, wherein, during the acceleration step, the temperature of the container is kept within a predefined temperature interval.

13. The method according to claim 1 and comprising an insertion step, during which the sample is inserted into the container by an instrument selected from the group consisting of: microfluidic devices, pipetting instruments, flow cytometers, micromanipulators, and optical tweezers.

14. The method according to claim 1, wherein the sample comprises at least one microparticle provided with at least one magnetic component; during the acceleration step, a magnetic force is exerted upon the at least one microparticle towards the side wall and/or the closed end.

15. The method according to claim 1, wherein, during the acceleration step, a magnetic force is exerted towards the opening so as to remove undesired material from the container.

16. The method of claim 2, wherein the at least one particle remains in the area of said first closed end.

17. The method of claim 7, wherein the at least one microparticle is selected from the group consisting of stem cells, erythroblasts, trophoblasts, neuronal cells, epithelial cells, tumour cells, white blood cells (WBC), stromal cells, sperm cells, circulating tumour cells (CTC), fetal cells, micro-beads, colloidal suspension, assemblies formed by micro-beads bound with cells, erythrocytes, circulating tumour cells bound with ferrofluid, and combinations thereof.

18. The method of claim 9, wherein the treatment step comprises an incubation sub-step, which is subsequent to the first addition sub-step and prior to the second addition sub-step and during which the reactant is left with the sample.

19. The method of claim 11, wherein the retaining system comprises an element selected from the group consisting of: absorbing material, capillary trap, liquid trap, and a combination thereof; the capillary trap comprising a plurality of grooves having a width that is smaller than 2.0 mm, wherein the liquid trap comprising a collecting chamber, which is provided with an inlet, and at least one movable wall, which is movable between a closing position, in which it prevents liquid from flowing through the inlet, and an opening position, in which the liquid can flow through the inlet; during the acceleration step, said acceleration moves the movable wall to the opening position; once the acceleration is no longer applied to the container.

20. The method of claim 1, wherein a magnet is arranged in the area of the first closed end.

* * * * *